US010151083B2

(12) United States Patent
Kent et al.

(10) Patent No.: US 10,151,083 B2
(45) Date of Patent: *Dec. 11, 2018

(54) HONEYCOMB MODULE AND UNDERGROUND STORAGE SYSTEM

(71) Applicant: Bio Clean Environmental Services, Inc., Oceanside, CA (US)

(72) Inventors: Zachariha J. Kent, San Antonio, TX (US); John Scott, Oceanside, CA (US)

(73) Assignee: Bio Clean Environmental Services, Inc., Oceanside, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/657,253

(22) Filed: Jul. 24, 2017

(65) Prior Publication Data

US 2017/0321397 A1    Nov. 9, 2017

Related U.S. Application Data

(63) Continuation-in-part of application No. 15/135,514, filed on Apr. 21, 2016, now Pat. No. 9,732,508.
(Continued)

(51) Int. Cl.
*E03F 1/00* (2006.01)
*E02B 11/00* (2006.01)
(Continued)

(52) U.S. Cl.
CPC .................. *E03B 3/03* (2013.01); *B65G 5/00* (2013.01); *E03B 11/14* (2013.01); *E03F 1/002* (2013.01);
(Continued)

(58) Field of Classification Search
CPC ........... E03F 1/003; E03F 1/005; E02B 11/00; E02B 11/005
See application file for complete search history.

(56) References Cited

U.S. PATENT DOCUMENTS 5,017,042 A    5/1991 Minor
5,810,510 A    9/1998 Urriola
(Continued)

FOREIGN PATENT DOCUMENTS

DE        4400183 A       7/1995
DE        4400183 A1 *    7/1995    .............. E02B 11/00
(Continued)

OTHER PUBLICATIONS

Almanstoetter Juergen DIPL PHY, "Hexagonal drainage elements assembled as drainage lining for open refuse tip", Notification date Feb. 7, 2018, Translation DE9319264 U1 (Original Doc. published Jul. 6, 1995), 6 pages.

*Primary Examiner* — Frederick L Lagman
(74) *Attorney, Agent, or Firm* — Steven W. Webb

(57) ABSTRACT

Individual honeycomb shaped modules used in an assembly for underground storage of storm water and other fluid storage needs. Modules are assembled into a resultant honeycomb shape for maximized structural strength and material use efficiency. Internal hexagonal or square shaped modules are assembled and encased by external hexagonal or square shaped modules. Internal adjacent modules are in direct fluid communications with one another through a channel-less chamber. Internal hexagonal or square shaped modules drain into external hexagonal or square shaped modules chamber where fluid is either stored or drained. Assemblies include various top and side pieces along with access ports for entry into said assembly.

31 Claims, 30 Drawing Sheets

US 10,151,083 B2
Page 2

Related U.S. Application Data

(60) Provisional application No. 62/394,118, filed on Sep. 13, 2016.

(51) Int. Cl.
  *E03B 3/03* (2006.01)
  *E03B 11/14* (2006.01)
  *B65G 5/00* (2006.01)
  *F17C 3/00* (2006.01)
  *E21D 13/00* (2006.01)
  *B65D 88/76* (2006.01)

(52) U.S. Cl.
  CPC .............. *E03F 1/005* (2013.01); *F17C 3/005* (2013.01); *B65D 88/76* (2013.01); *E02B 11/005* (2013.01); *E21D 13/00* (2013.01); *F17C 2203/0612* (2013.01)

(56) References Cited

U.S. PATENT DOCUMENTS

| | | |
|---|---|---|
| 5,848,856 A | 12/1998 | Bohnhoff |
| 6,095,718 A | 8/2000 | Bohnhoff |
| 6,419,421 B1 | 7/2002 | Whitfield, Jr. |
| 7,080,480 B2 | 7/2006 | Urban |
| 7,591,610 B2 | 9/2009 | Krichten |
| 7,621,695 B2 | 11/2009 | Smith |
| 8,360,100 B2 * | 1/2013 | Burkhart, Sr. .......... E03F 5/101 137/265 |
| 8,590,564 B2 * | 11/2013 | Burkhart, Sr. .......... E03F 5/101 137/265 |
| D767,924 S | 10/2016 | Livingston |
| D786,510 S | 5/2017 | Murljacic |
| D795,384 S | 8/2017 | Kent |
| 9,732,508 B1 * | 8/2017 | Kent ....................... E03F 1/002 |
| D810,857 S | 2/2018 | Zarraonandia |
| D810,858 S | 2/2018 | Zarraonandia |
| 2004/0076473 A1 | 4/2004 | Burkhart |
| 2007/0053746 A1 | 3/2007 | Krichten |
| 2007/0217866 A1 | 9/2007 | Oscar |
| 2009/0049760 A1 | 2/2009 | Allard |
| 2009/0279953 A1 * | 11/2009 | Allard ..................... E03F 1/005 405/39 |
| 2010/0021236 A1 | 1/2010 | Kreikemeier |
| 2011/0253238 A1 | 10/2011 | Burkhart, Sr. |
| 2014/0105684 A1 | 4/2014 | Allard |
| 2014/0291221 A1 | 10/2014 | Adams |
| 2016/0097175 A1 | 4/2016 | Parker |
| 2016/0265209 A1 | 9/2016 | Graf |
| 2016/0333566 A1 * | 11/2016 | Zarraonandia .......... E03F 5/101 |
| 2017/0328052 A1 * | 11/2017 | Kent ....................... E03F 1/003 |
| 2018/0030712 A1 * | 2/2018 | Kent ....................... E03F 1/005 |

FOREIGN PATENT DOCUMENTS

| | | |
|---|---|---|
| GB | 2417733 A | 3/2006 |
| WO | 2013159737 A1 | 10/2013 |

* cited by examiner

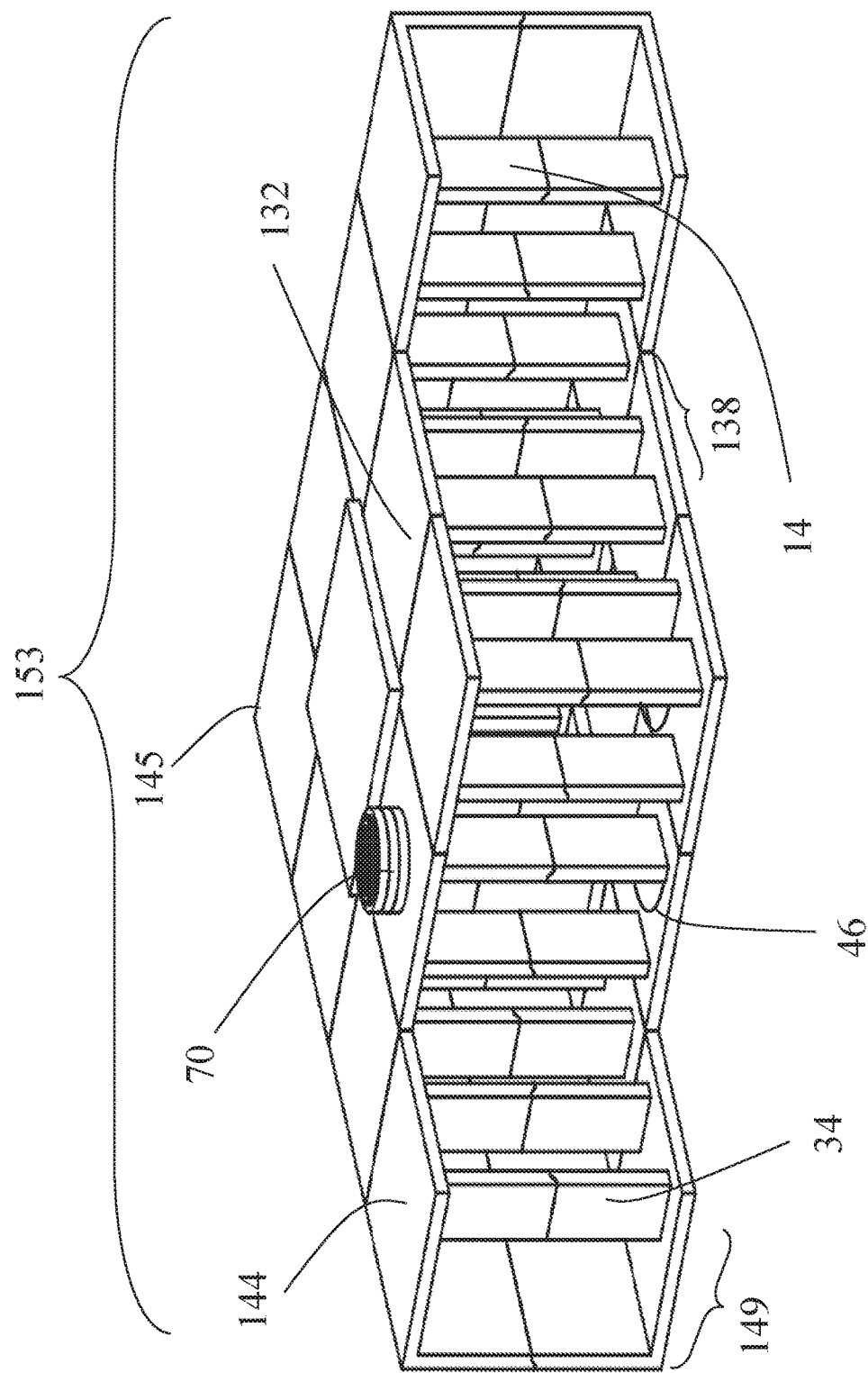

HONEYCOMB MODULE AND UNDERGROUND STORAGE SYSTEM

CROSS-REFERENCE TO RELATED APPLICATION(S)

The present application is a Continuation-in-Part of U. S. patent application Ser. No. 15/135,514, filed on Apr. 21, 2016, now U.S. Pat. No. 9,732,508 issued on Aug. 15, 2017 and a Non-provisional conversion of U. S. Provisional Patent Application Number 62/394,118, filed on Sep. 13, 2016. Additionally, the subject matter of the present application is related to the following patent applications: U. S. Design Patent Application Number 29/567,711 filed on Jun. 10, 2016; U. S. Design Patent Application Number 29/567, 713, filed on Jun. 10, 2016 and U. S. Design Patent Application Number 29/571,016, filed on Jul. 13, 2016. The above-referenced applications, including the drawings, are specifically incorporated by reference herein in their entirety for all that they disclose and teach and for all purposes.

FIELD OF THE INVENTION

The embodiments of the present technology relate, in general, to the capture, storage, infiltration, and filtration of fluids, use system and methods of using the same, including the subterranean water capture, storage, infiltration and filtration, use system and methods of using the same. Although the present invention is described in context of stormwater storage and filtration, the invention is not so limited.

BACKGROUND

Fluid storage systems have been in existence for many years, specifically underground storage systems for the collection and storage of water. While water is collected underground for various reasons, over the past 20 years there has been increased focus on collecting and storing storm water runoff. This is done because of two main concerns. The quantity of storm water runoff is a concern because larger volumes of associated runoff can cause erosion and flooding. Quality of storm water runoff is a concern because storm water runoff flows into our rivers, streams, lakes, wetlands, and/or oceans. Larger volumes of polluted storm water runoff flowing into such bodies of water can have significant adverse effects on the health of ecosystems.

The Clean Water Act of 1972 enacted laws to improve water infrastructure and quality. Storm water runoff is the major contributor to non-point source pollution. Studies have revealed that contaminated storm water runoff is the leading cause of pollution to our waterways. As we build houses, buildings, parking lots, roads, and other impervious surfaces, we increase the amount of water that runs into our storm water drainage systems and eventually flows into rivers, lakes, streams, wetlands, and/or oceans. As more land becomes impervious, less rain seeps into the ground, resulting in less groundwater recharge and higher velocity surface flows, which cause erosion and increased pollution levels in water bodies and the environment.

To combat these storm water challenges associated with urbanization storm water detention, infiltration and retention methods have been developed to help mitigate the impact of increased runoff. Historically, open detention basins, wetlands, ponds or other open systems have been employed to capture storm water runoff with the intention of detaining and slowly releasing downstream over time at low flows using outlet flow controls, storing and slowly infiltrating back into the soils below to maximize groundwater recharge or retain and use for irrigation or other recycled water needs. While the open systems are very effective and efficient, the cost of the land associated with these systems can make them prohibitive. In areas such as cities or more densely populated suburbs the cost of land or availability of space has become limited. In these areas many developers and municipalities have turned to the use of underground storage systems which allow roads, parking lots, and building to be placed over the top of them.

A wide range of underground storage systems exist, specifically for the storage of storm water runoff. Arrays of pipes, placed side-by-side are used to store water. Pipe systems made of concrete, plastic or corrugated steel have been used. More recently arched plastic chamber systems have been in use. As with pipes, rock backfill is used to fill the space surrounding them to create added void areas for storing additional water along with providing additional structural reinforcement.

In general, these types of systems require at least one foot of rock backfill over the top and at least one or more feet of additional native soil over the top to support the loading associated with vehicles on streets and parking lots. These systems also require rock backfill of a foot or more around their perimeter sides to provide structural reinforcement due to lateral loading associated with soil pressure.

Lastly, these systems must also be placed on a rock base for structural support. Because these systems are rounded or arched, a substantial amount of rock backfill must be used to surround them and placed in between the systems. As such, the amount of void space available for storing water compared to the amount of soil required to be excavated is only around 60 percent.

Over time, plastic and concrete rectangular or cube shaped modular systems were developed that more efficiently stored storm water because the modules could be placed side-to-side and end-to-end without the need for additional rock backfill to be placed between each module as found with pipe and arched systems. With these rectangular and cube shaped systems the void space available for storing water compared to the amount of soil required to be excavated is up to 90% or more. While plastic type rectangular and cubed systems still require at two feet of rock backfill over the top, two feet around the perimeter sides, and six inches underneath to handle downward and lateral loading, the concrete rectangular and cubed systems do not.

Concrete rectangular or cubed modular systems have the benefit of not requiring rock backfill over the top or surrounding the sides because of their additional strength when compared to plastic systems. Yet, these rectangular or cubed concrete structures still have depth limitations due to the lateral loading associated with soil pressure.

For example, currently available concrete systems cannot have the bottom of the structure be deeper than eighteen feet below surface level without modifying the standard wall thickness of the structure from six inches to eight inches or more plus adding additional rebar reinforcement. Doing so adds cost, weight and complexity to design. This inherent design limitation is related directly to the shape and design of these structures.

Concrete rectangular or cube shaped structures have five sides, four vertically extending walls and a bottom or top side. One side must be open because of how pre-cast concrete molds are made and how the concrete structure is pulled from the mold. At least one side of the concrete structure must be missing for it to be pulled from the metal mold that consists of inner and outer walls and either a top or bottom side.

Unfortunately, this missing side which is required for manufacturing, creates an inherent weak point for the walls. The middle of each wall, especially the longer walls for rectangular structures, where the wall meets the end of the missing top or bottom side has no perpendicular connection as with the opposite side of the same wall where it connects to the top or bottom side. This weak point on the center of each wall at the open end is the reason why these systems have depth limitations. This is known as deflection. This weak point becomes further exaggerated the taller the wall becomes and the longer it becomes; the further away it is from the perpendicular connecting floor or adjacent wall on the opposite end. Therefore, taller systems which extend down deeper from the surface underground run into a compounding problem of taller walls and increased lateral loading (soil pressure).

Recently, an approach to the aforementioned technical problem has been to replace solid wall chambers with cantilever, or semi-arched arm braces, to support the top module. This approach falls short of addressing common problems in the industry as these systems still cannot sustain increased soil pressure and lateral loading due to its shape without need to increase the wall thickness of the modules or increase the amount of rebar reinforcing therefore increasing material and overall cost of deep installations. The present technology presents a novel approach to addressing common industry limitations.

Furthermore, there are also equipment limitations with concrete rectangular or cubed shaped structures. Most precast concrete plants utilize an overhead crane inside a metal building. The height of this crane is a limitation on how tall a single five sided, four walls and a top or bottom side, structure can be. The process of pulling a concrete casting from the mold requires it to be pulled up from the mold, opposite of the open side, sliding the walls out from between the inner and out mold walls.

Because of this method, generally the walls of these concrete structures are not greater than seven feet tall. Therefore, in order to make a taller overall structure, two shorter structures must be stacked on top of each other in a "clamshell" configuration with open ends facing each other so that the joined structure has one top and one bottom. Once again, the weak point being in the middle of each wall, horizontally, on the end opposite of the perpendicular connecting top or bottom side.

Lastly, current designs of concrete rectangular or cubed shaped structures, have limitations related to shipping, primarily on large flatbed trucks. These trucks have transportation limits on weight, length, width and height. Standard flatbed trucks are forty feet long. A standard load width is eight feet and a wide load up to twelve feet. Anything wider requires pilot cars and an escort which is very expensive. Also, height limitations are generally eight feet in order to be transported on most interstates due to overpasses. Standard weight limitations are forty-five thousand pounds. When designing a typical subterranean water capture, storage, infiltration system and related apparatuses it is important to make the structure as large as possible without exceeding the shipping limitations to maximize feasibility due to economies of scale.

As explained, current designs of underground systems have limitations related to weight bearing loads from above and from the sides. These systems must be designed without risk of cracking, collapsing or other types of structural failure. Concrete rectangular or cubed structures have inherent weak points which limit the depth at which they are installed with standard wall thicknesses and design. The inherent flaw is related to the basic shape of the structure which has walls running perpendicular and parallel to one another.

The need for a system overcoming these inherent shape-related limitations is evident. The present invention provides an exemplary solution including the method, system, and apparatuses derived from principles of biomimetics; specifically, the employment of honeycomb shape modules, also referred to as a reticular web structures, and hexagonal shapes. Design inspired by these efficient structures found in nature and the employment these more economic natural shapes, in combination with current precast concrete design processes, present a unique approach for overcoming the limitations of the previous approaches in the industry.

One of the most efficient structures in nature is the honeycomb which is found in beehives, honeycomb weathering in rocks, tripe and bone. The related hexagon shape has been found to make the most efficient use of space and building materials. Throughout history this structure has been admired to be very light, strong and structurally efficient. While this technology has been applied to paper products, composite materials, metals like aluminum, plastics, and carbon nanotubes.

SUMMARY

The invention provides an exemplary method, system, and apparatuses depicted, in one of its many embodiments, as a module and an assembly of modules for collection, storage, infiltration, and treatment of liquid. In accordance with certain embodiments, an improved modular, underground hexagonal shaped module(s) design and resulting honeycombed shaped assemblies and related components is disclosed. The uniqueness of the shape of each module and the way in which modules are assembled creates a honeycomb structure for maximized strength with minimized use of material. The hexagonal shape provides superior strength on all sides of each module and the assembly as a whole when compared to any rectangular or cubed shaped module. Its ability to equally distribute loads from the earth on its sides allows it to be installed deeper with reduced wall thickness and rebar reinforcing.

In accordance with certain embodiments, an improved modular, underground hexagonal shaped module(s) design and resulting honeycombed shaped assemblies and related components for collection and storage of storm water.

In accordance with certain embodiments, an improved modular, underground hexagonal shaped module(s) design and resulting honeycombed shaped assemblies and related components for infiltration of storm water by utilizing channel-less water flow patterns and a porous base or holes in the floor and/or outflow pipes.

In accordance with certain embodiments, an improved modular, underground hexagonal shaped module(s) design and resulting honeycombed shaped assemblies and related components for the storage, treatment and infiltration of and other collected and stored, non-flammable fluid needs are provided.

In accordance with certain embodiments, a hexagonal shaped module(s) design and resulting honeycombed shaped assemblies and related components with internal hexagonal modules placed within external hexagonal modules; wherein the internal modules have legs and optional side walls, wherein the external hexagonal modules have a combination of legs and walls.

In accordance with other embodiments, a hexagonal shaped module(s) design and resulting honeycombed shaped assemblies and related components with internal hexagonal modules placed within external hexagonal modules; wherein the internal modules have legs and no side walls, wherein the external hexagonal modules have a combination of legs and walls.

In accordance with some embodiments, assembly can be configured into various shapes and sizes, all being of a honeycomb pattern, and are useful for meeting the size, space and shape restrictions of locations where the assemblies are being installed.

In accordance with yet another embodiment, assembly of the hexagonal modules and their components may be arranged into squares, circles, rectangles, L shapes, S shaped, U shaped and other shapes required to fit within the construction site constraints.

It should be appreciated that embodiments of the present technology are disclosed herein, with the preferred embodiment for the management of storm water runoff underground.

Further embodiments will be apparent from this written description and accompanying figures.

DETAILED DESCRIPTION

The present embodiment provides a hexagonal module and assembly of modules for the underground collection and storage of fluids. The hexagonal modules offer enhanced strength and efficiency individually and in assembly of multiple modules. Modules can be assembled into various shapes and sizes, all being of a honeycomb pattern, to meet the size, space and shape restrictions of locations where the assemblies are being installed.

The module assembly can be generally square, round, rectangular, L-shaped or other shapes to work around other underground structures, including but not limited to sewer lines, utilities, fuel storage tanks, water mains and others. The hexagonal shape and resulting honeycomb assembly provides greatly improved strength at increased depths when compared to currently available technologies and thus overcomes limitations with lateral soil pressures which increase proportionately to the depth below the ground surface.

Hexagonal modules and resulting honeycomb assemblies can be installed at various depths and at various module heights. The top of the top module can be flush with the ground surface and placed in parking lots, landscape areas, sidewalks, airports, ports and streets and can be designed to handle site specific loading conditions such as parkway, indirect traffic, direct traffic and others. The module and assembly can also be placed deeper underground with the top of the top module being from a few inches to several dozen feet below finish surface due to its high strength design. The height of the individual modules or resulting assembled two-piece module can be from a few feet to over a few dozen feet in height.

The hexagonal shape and honeycomb assembly will allow this system, used for storage of fluids, to be installed deeper underground and be able to handle increased pressure and soil loads due to its shape without need to increase the wall thickness of the modules or increase the amount of rebar reinforcing therefore decreasing material and overall cost of deep installations. This is a major benefit over existing technologies or methods.

In certain embodiments of the present technology, the absence of interior walls in the design of the interior module sand the way modules join together with up to one module being in direct fluid communication with six other modules promotes unrestricted water flow between modules in all directions. This results in a more hydraulically efficient system and allows for fluid to evenly disburse through the assembly and minimize drag, velocities within the system, head loss and in turn enhance the system's ability to capture pollutants contained within the incoming storm water runoff, especially pollutants such as trash, sediment and TSS which are more easily removed when velocities are reduced via settling.

Figure 8:
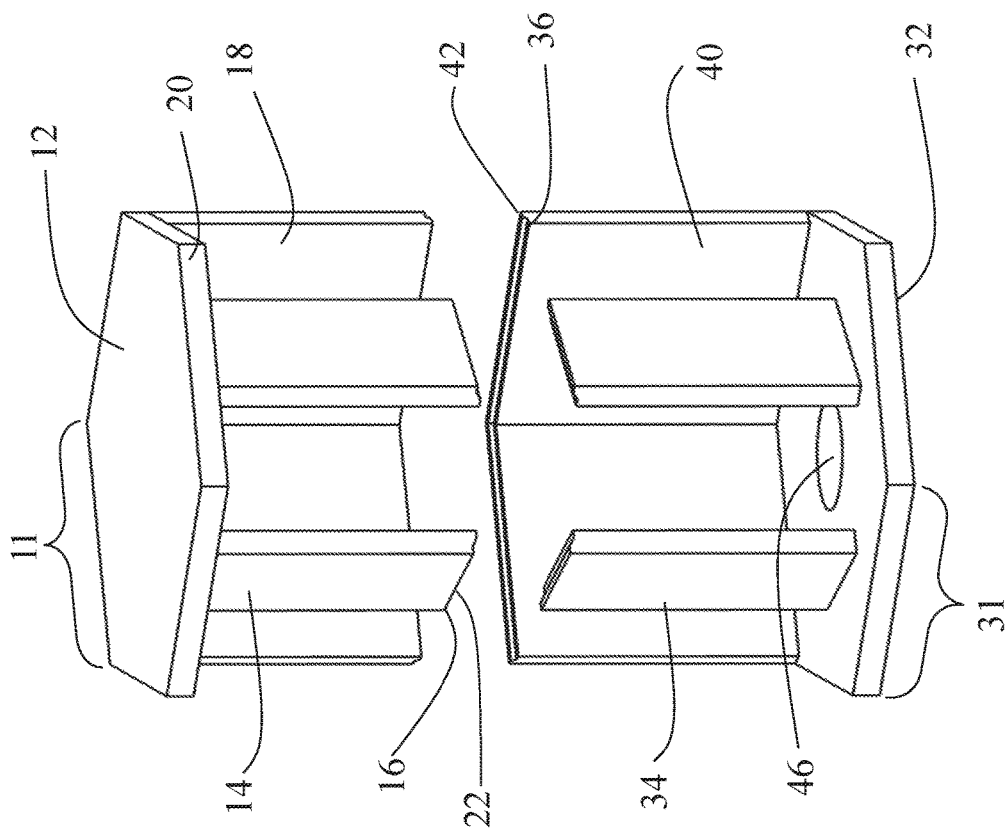
FIG. 8 illustrates a perspective view of a perimeter hexagonal top module of FIG. 7, a male ship lap joint 22 and a bottom module female ship lap joint 42 with the addition of a bottom module side wall 40, a perimeter hexagonal bottom module 31 and a drainage hole 46, in accordance with one embodiment.
Figure 16:
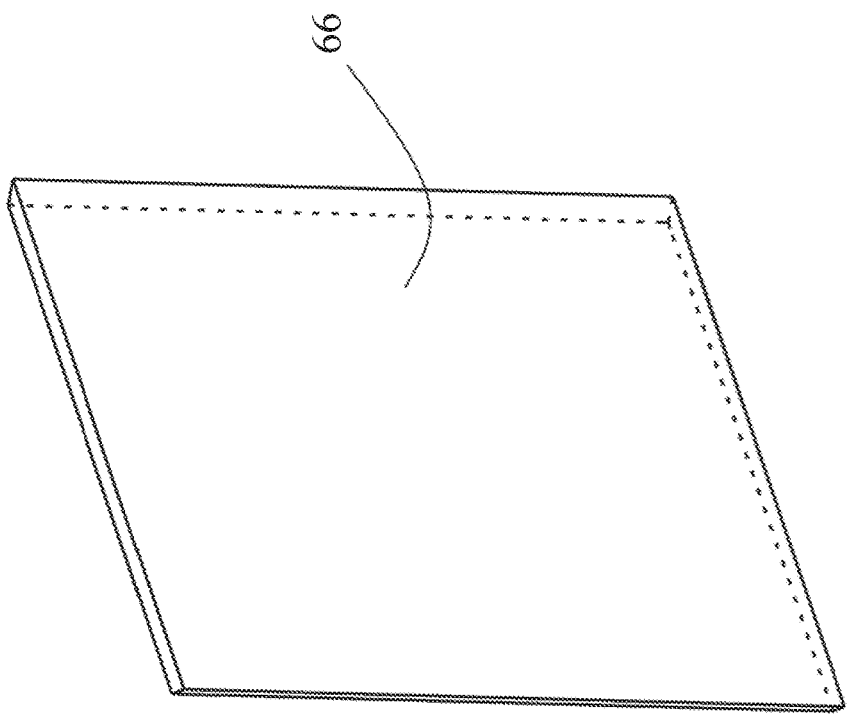
FIG. 16 illustrates a side wall panel used in a completed hexagonal storage system assembly and placed on its perimeter walls and spanning between hexagonal modules, in accordance with one embodiment.

In another embodiment, drainage holes at the bottom of a module allow storm water to fully drain out to the floor preventing standing water. FIG. 8 illustrates one embodiment of a single drain hole 46; however, a module may contain zero to many drainage holes 46 placed in the floor 32 of the bottom module 30 when infiltration of water back into the native soil below the hexagonal module assembly storage system 90 is desired, see FIG. 21 as an example. These drainage holes allow water to exit the system evenly throughout every bottom module 30. To connect the module assembly 90, both inflow pipes 80 and outflow pipes 82 as in FIG. 11 and FIG. 12 can be connected to the assembly 90 through any of the module side walls 18, 40 and 66 as depicted in FIG. 16.

In accordance with certain embodiments, modifications of side walls 40 in specific chambers can also be made near inflow points to act as pre-treatment settling chambers and isolate incoming sediments and other pollutants.

In some embodiments, specific chambers near outlet points can be modified to include treatment devices or methods such as media filters, membrane filters, biofilters to further treat storm water runoff before leaving the system.

Figure 1:
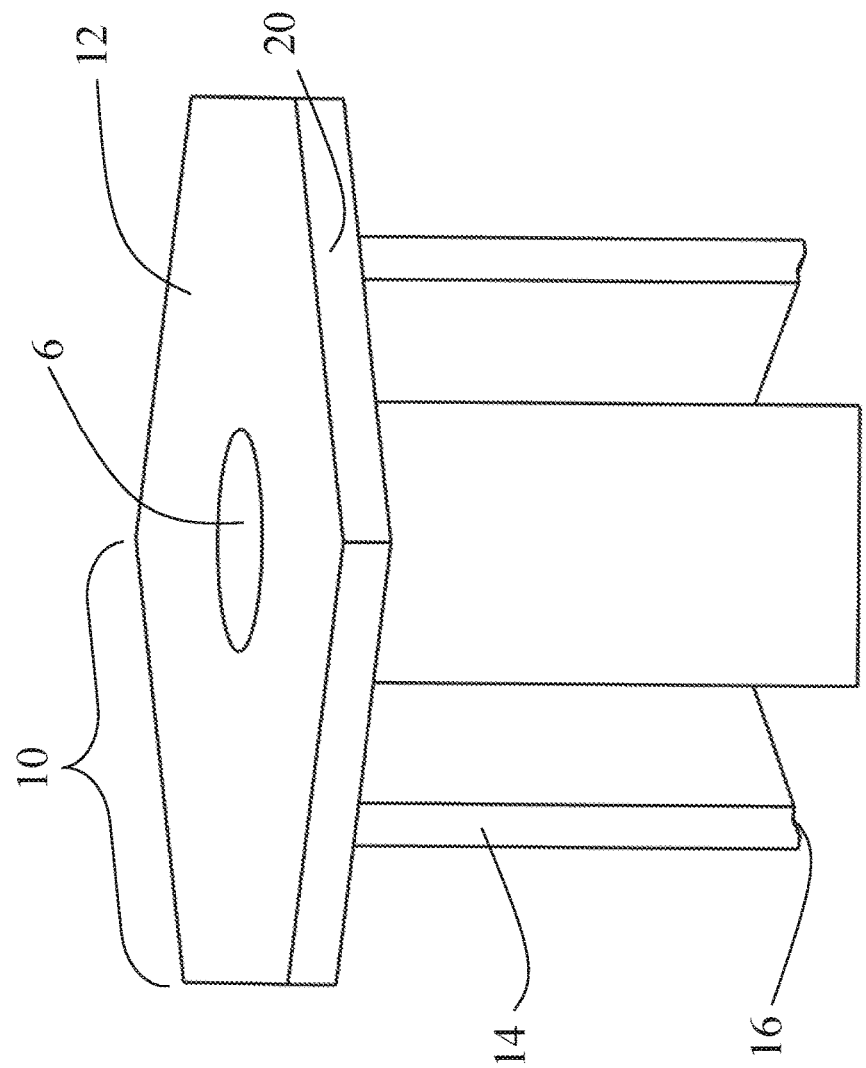
FIG. 1 illustrates a perspective view of the internal hexagonal top module illustrating the modules' top 12, access hole 6, legs 14, the top modules' bottom of legs 16 and the internal top module side edge 20, in accordance with one embodiment.

In the preferred embodiment, the interior hexagonal module is located adjacent to perimeter hexagonal modules FIG. 1 begins to illustrate a full hexagonal module assembly storage system 90 with hexagonal internal top module 10 designed to collect and store water underground and maintainable through the access hole 6. The top module is composed of a hexagonal shaped top 12 and three legs 14. The full hexagonal module assembly of FIG. 1 and FIG. 4 represent one embodiment of an unstacked top module used in more shallow, underground cavities wherein the assembled top module may be placed directly on a floor base or ground surface rather than being assembled to a bottom hexagonal module assembly.

Figure 2:
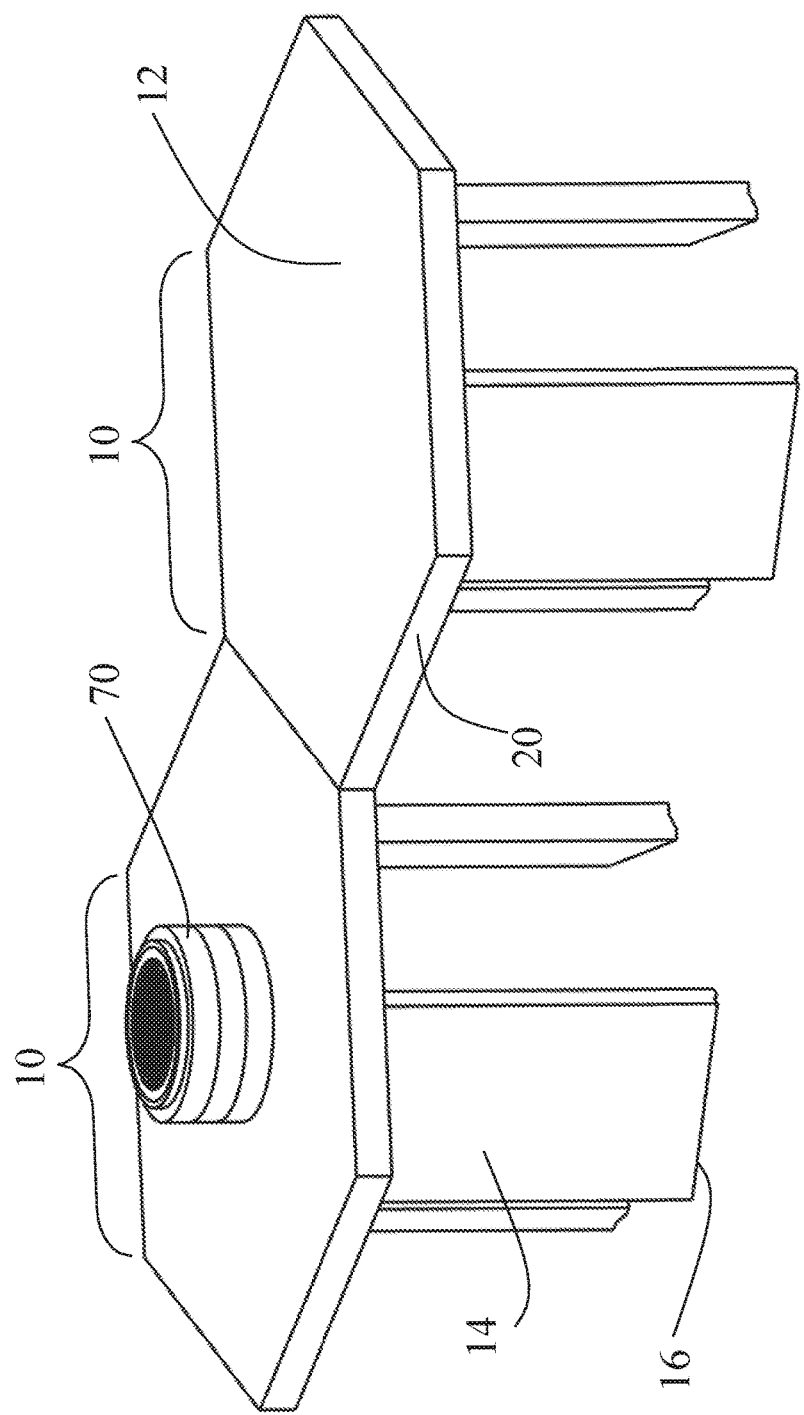
FIG. 2 illustrates a perspective view of internal hexagonal top modules shown in FIG. 1 with an access riser and access hatch assembly 70, in accordance with one embodiment.

FIG. 2 illustrates an internal hexagonal top module shown in FIG. 1 with an access riser and access hatch assembly 70 inserted over the access hole 6. Although a particular presentation of the top module and an access riser and access hatch assembly are presented, it is understood that this is an example and that other configurations in arrangement may be employed and are possible and contemplated without departing from the scope of the present disclosure.

Figure 3:
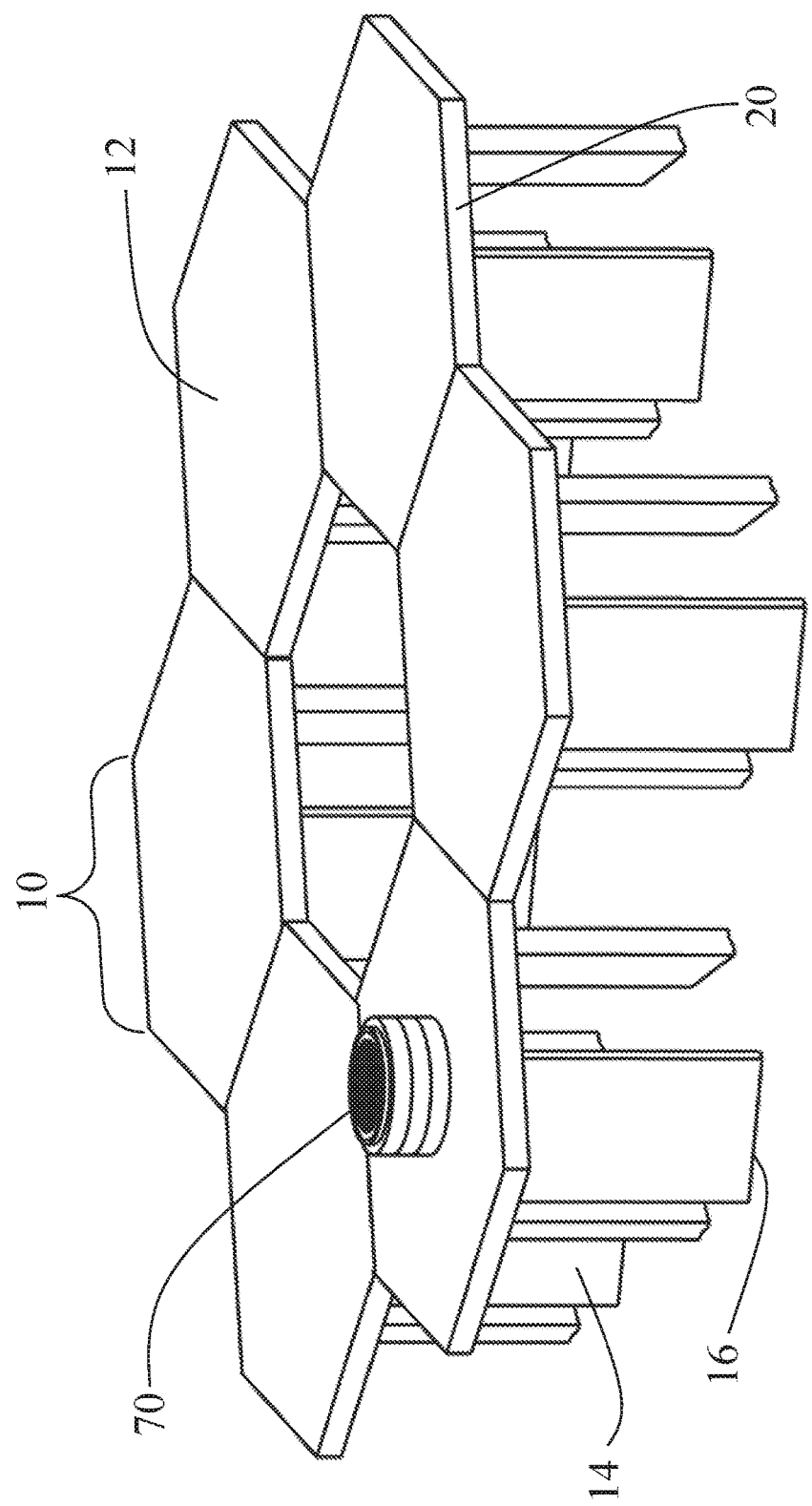
FIG. 3 illustrates a perspective view of an example of the assembly of internal hexagonal top modules adjacent to each other, and includes the access riser and access hatch as shown in FIG. 2, in accordance with one embodiment.
Figure 4:
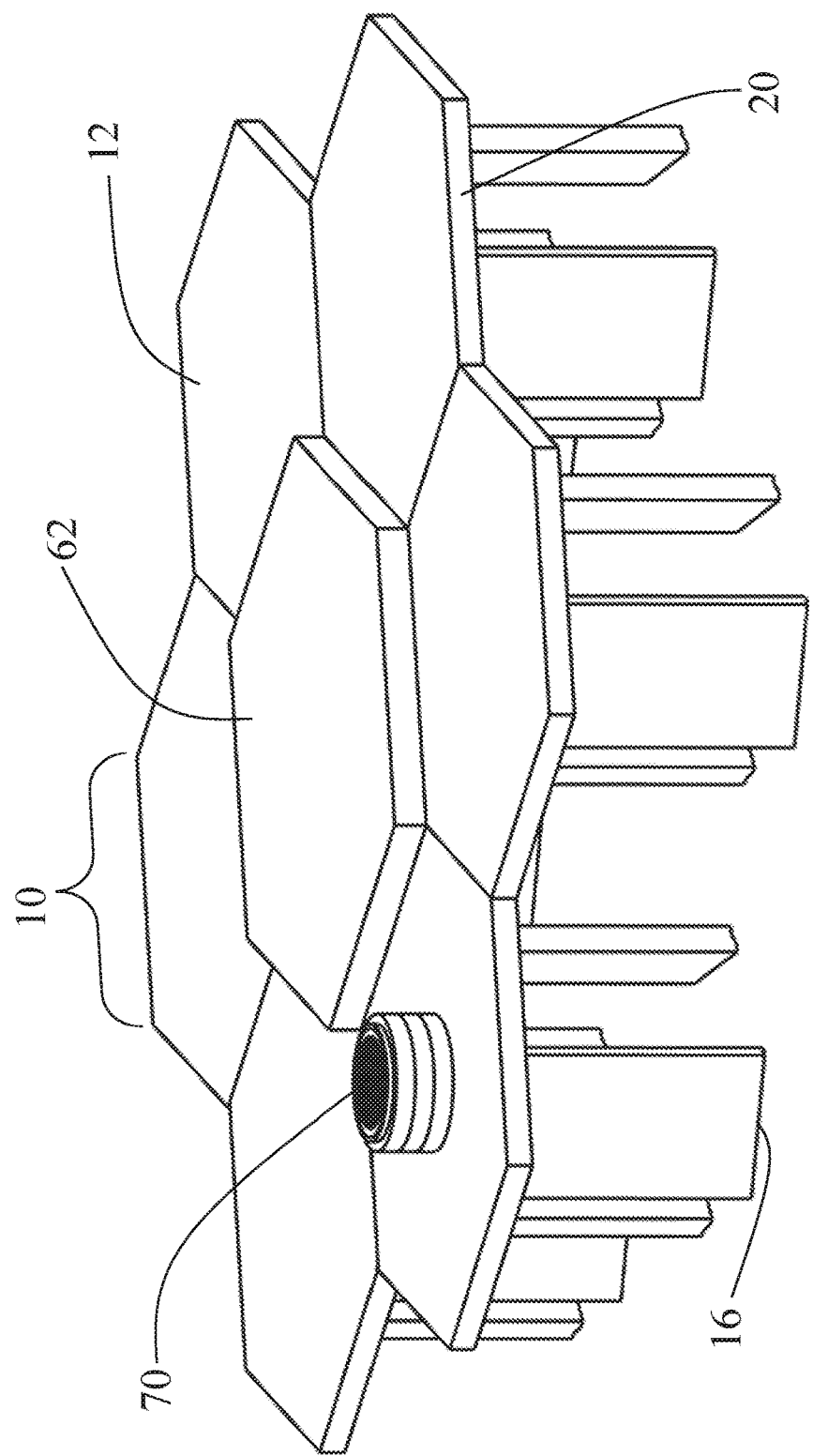
FIG. 4 illustrates the configuration of FIG. 3 with the addition of a hexagonal top slab 62, in accordance with one embodiment.

FIG. 3 and FIG. 4 provide an illustrated embodiment demonstrating a configuration of the multiple top modules. The open design provides water flow to disperse evenly through a channel-less hexagonal chamber.

Figure 5:
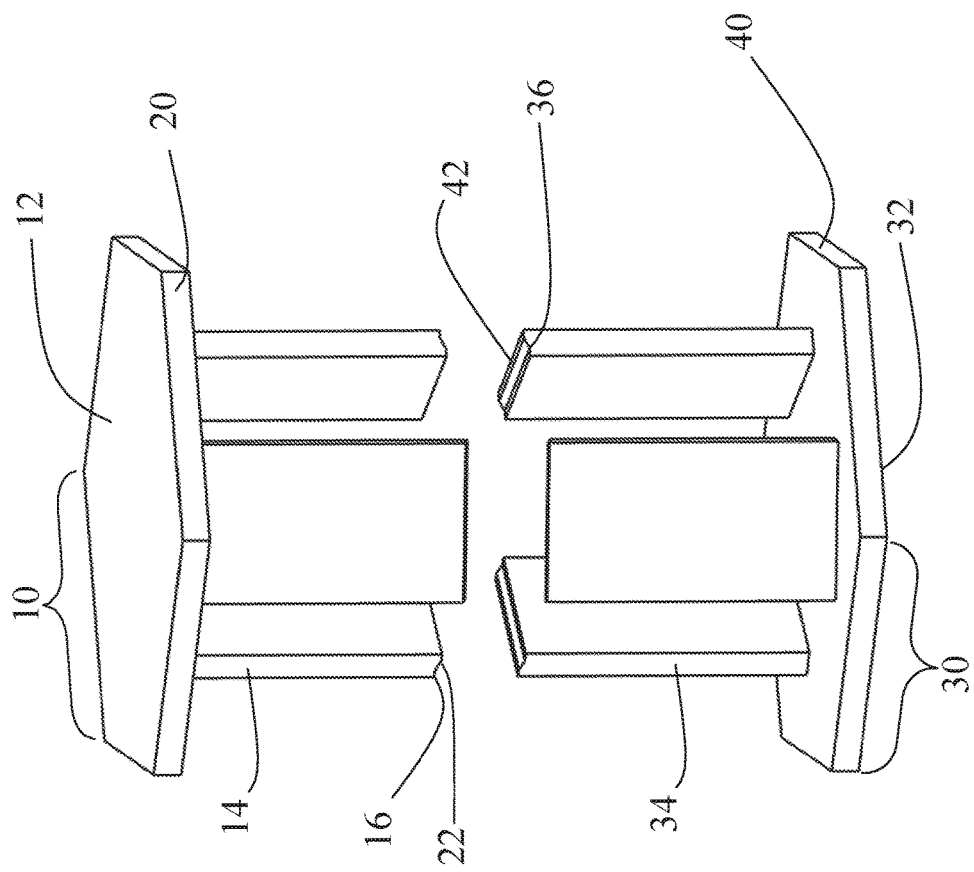
FIG. 5 illustrates a perspective view of the internal hexagonal top module shown in FIG. 1 and a hexagonal bottom module showing the various components of each module, including a bottom module floor 32, in accordance with one embodiment.
Figure 6:
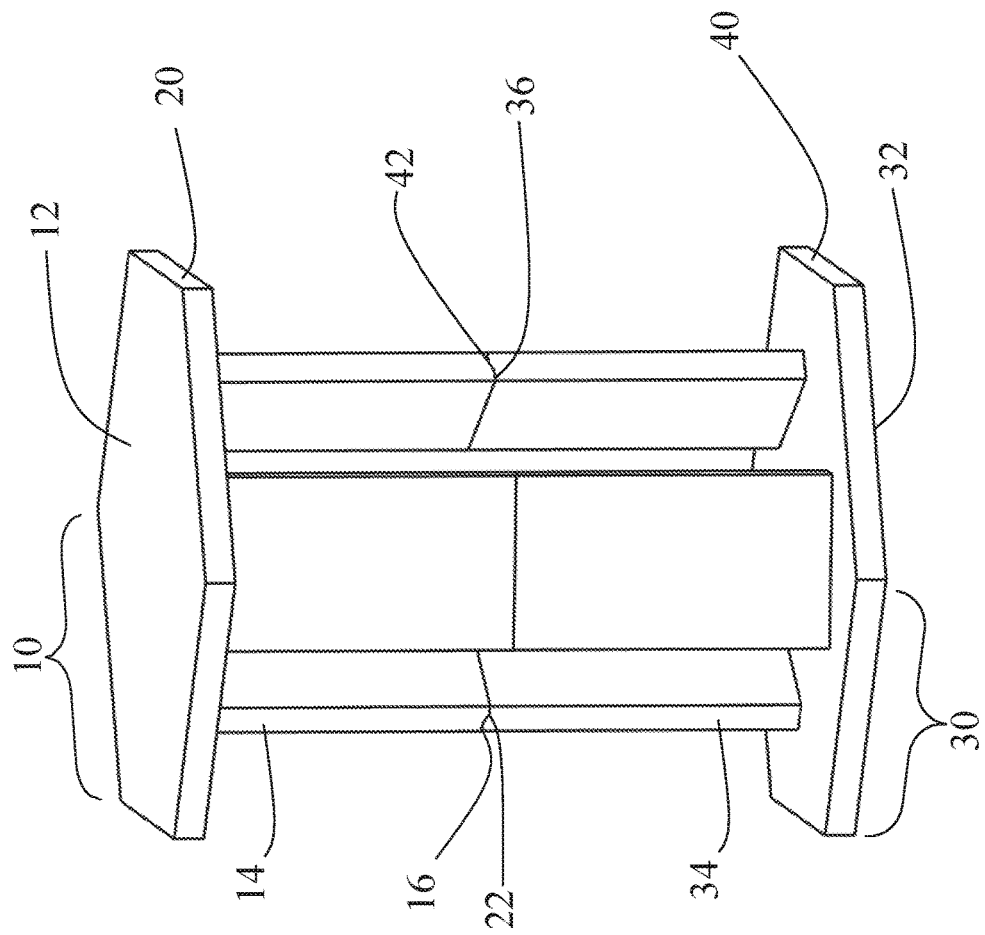
FIG. 6 is one embodiment illustrating a perspective view of the internal hexagonal top and bottom modules shown in FIG. 5 joined together with a top module male ship lap joint 22 and a bottom module female ship lap joint 42 in assembly of an internal hexagonal module, in accordance with one embodiment.

The illustrated embodiment of FIG. 5 and FIG. 6 demonstrate modular assembly where a hexagonal top module 10 can be joined with a hexagonal bottom module 30 to form an assembled hexagonal module as shown in FIG. 6. A hexagonal bottom module 30 is composed of the same components of the hexagonal top module 10 except the module 30 is upside down. The hexagonal top module has a hexagonal top slab 12 and the hexagonal bottom module 30 has a floor 32 and three legs 34.

In certain embodiments, the hexagonal module and assembly of modules include joint lines between modules which can be sealed with a waterproof sealant or the entire module assembly wrapped in a plastic liner to make the storage system water tight.

In yet another embodiment, in order to join together a hexagonal top module 10 with a hexagonal bottom module 30, a male shiplap joint 22 is added on the top module bottom of leg 16 and a female shiplap joint 42 is added on the bottom module top of leg 36. This male 22 to female 42 shiplap joint connection allows the hexagonal top module 10 and hexagonal bottom module 30 to be locked together without risk of horizontal shifting of the two stacked modules which form an assembled hexagonal module as in FIG. 6.

Conjoining of the modules is not limited to lap joints wherein differing construction environments may require different assembly latches, to increase, for example, the strength of the assembled module, may be employed and are possible and have been contemplated without departing from the scope of the present disclosure.

Figure 7:
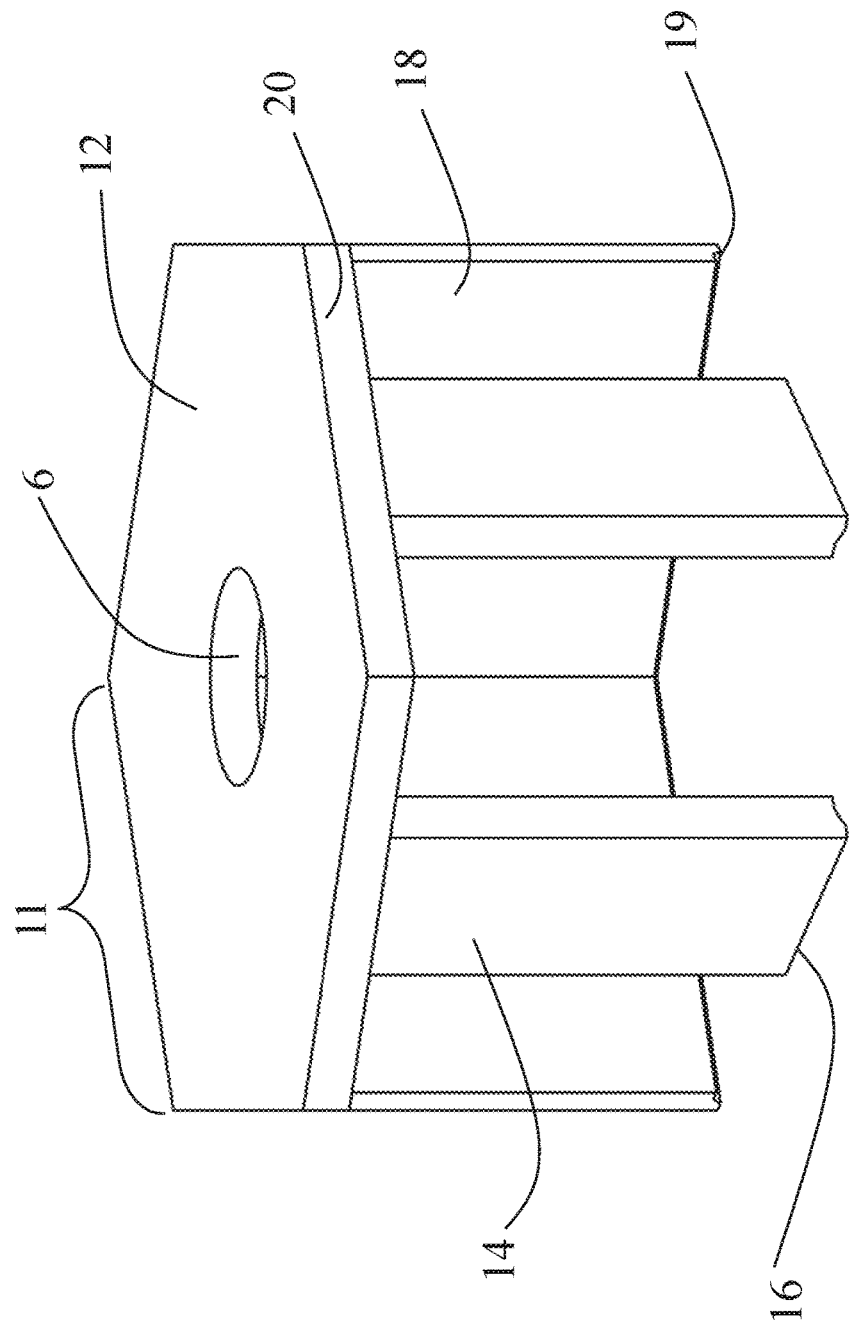
FIG. 7 illustrates a perspective view of perimeter hexagonal top module with the addition of a top module side wall 11, in accordance with one embodiment.

In another embodiment, the addition of side walls on the top module 18 of FIG. 7 and the bottom module 31 of FIG. 8 maybe installed to define a perimeter.

Figure 28:
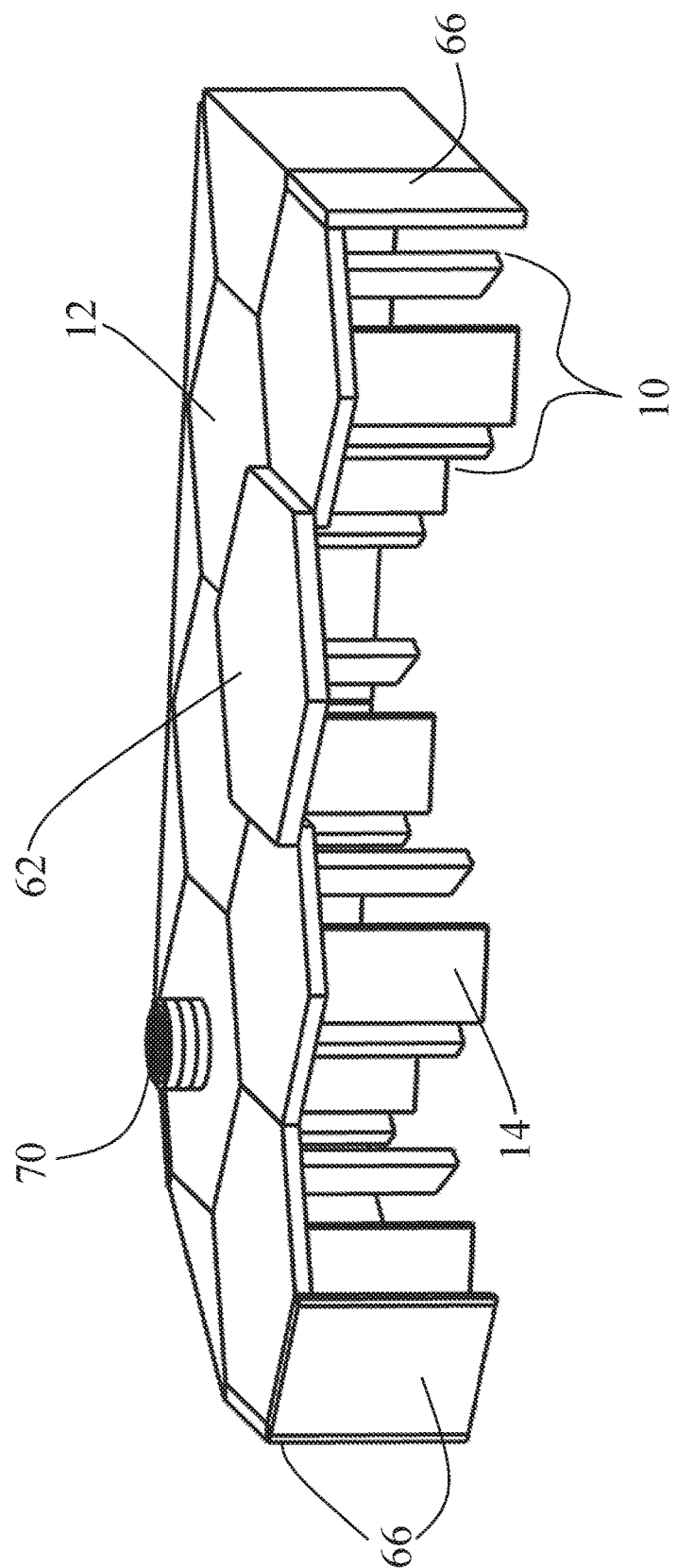
FIG. 28 illustrates a perspective view of the assembled top hexagonal internal modules 10, in accordance with one embodiment.
Figure 29:
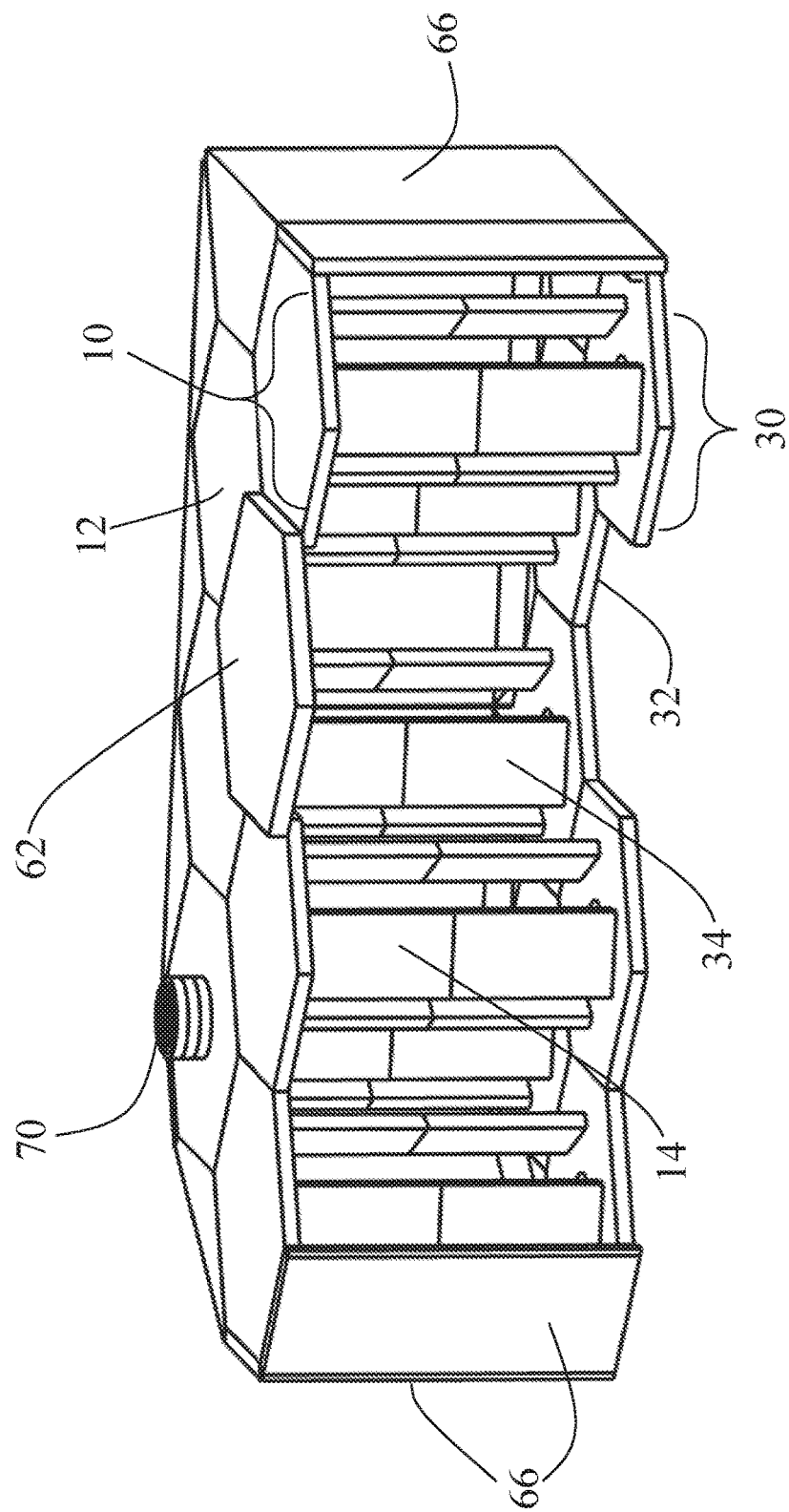
FIG. 29 illustrates a perspective view of multiple assembled top and bottom hexagonal modules arranged in a honeycomb pattern, in accordance with one embodiment.

In an alternate embodiment, the internal hexagonal top module 10 as presented in FIG. 28 and FIG. 29 lack side wall panels 66 and the internal hexagonal bottom module 30 of FIG. 29 also lacks side wall panels 66. The result is a lack of a perimeter in the internal modules. This reduces the overall materials required for an installation and thereby reduces costs.

Figure 9:
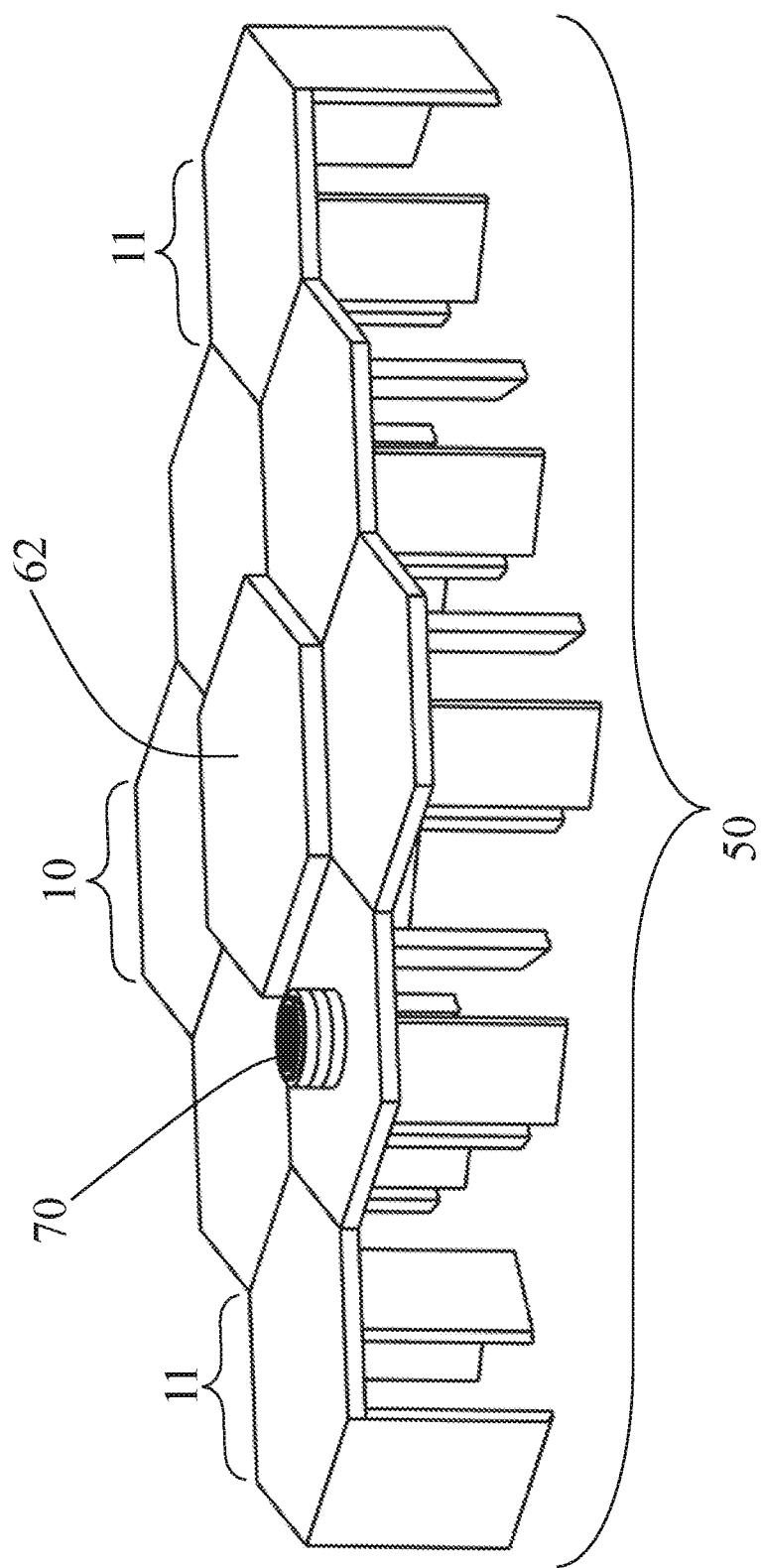
FIG. 9 illustrates a perspective view of the assembled top hexagonal internal modules of FIG. 4 and depicts the perimeter hexagonal top module, in accordance with one embodiment. hexagonal modules arranged in a honeycomb pattern, in accordance with one embodiment.
Figure 10:
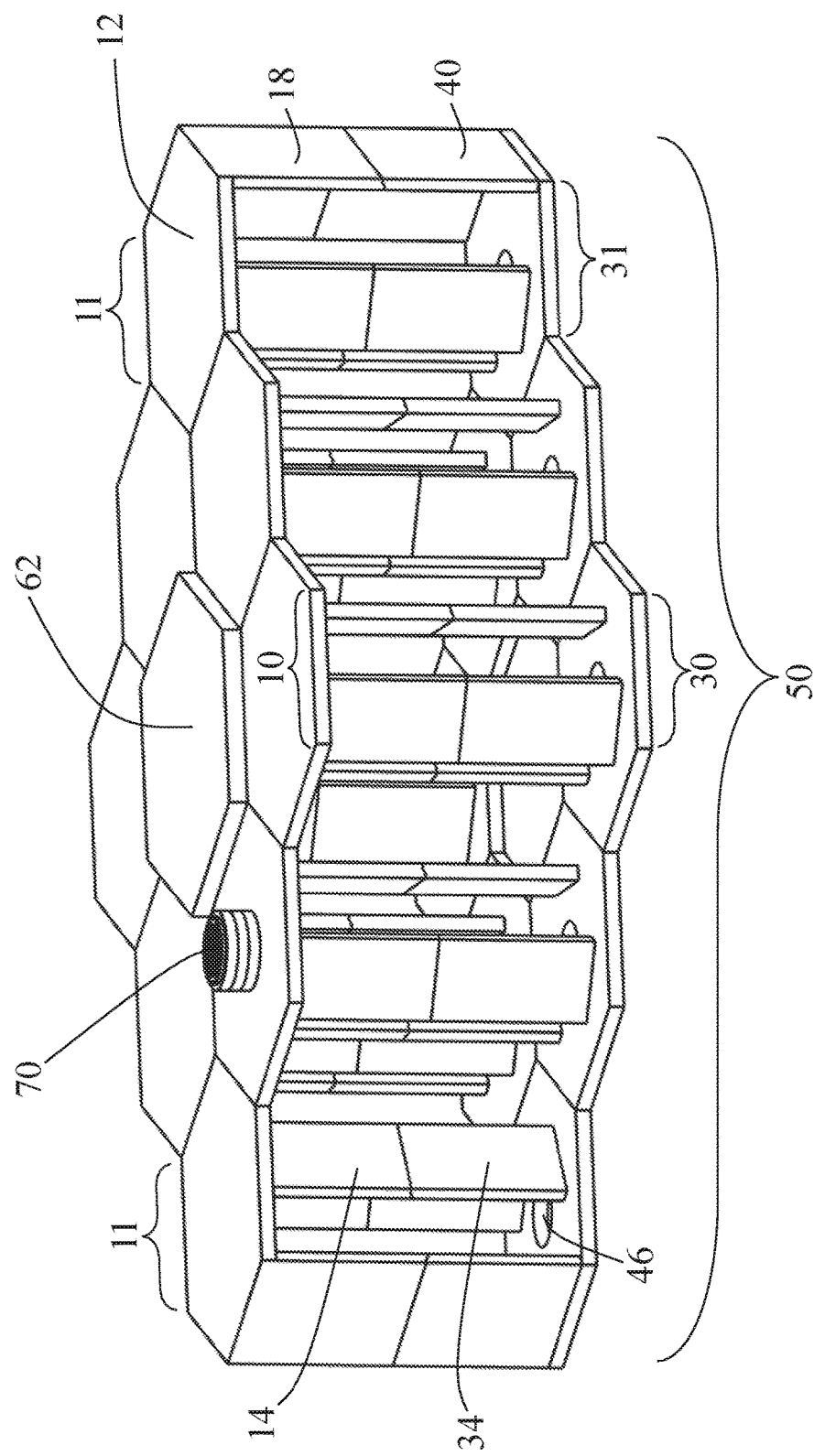
FIG. 10*a* illustrates a perspective view of multiple assembled top and bottom square modules arranged in a honeycomb pattern, in accordance with an alternate embodiment.

The hexagonal top module 10 can be used in conjunction with other hexagonal top modules 10, placed side by side, to create a honeycomb shaped hexagonal module assembly 50 as represented in FIG. 9. The assemblies 50 made of hexagonal top modules 10 can only be made so tall due to manufacturing limitations of the hexagonal top modules side wall 18 height. When taller hexagonal module assemblies 51 are required as in FIG. 10, the hexagonal top module 10 can be stacked on top of a hexagonal bottom module 30 to form a taller assembled hexagonal module 50. This taller assembled hexagonal module can be twice as tall as a single hexagonal top module 10 therefore resulting in taller honeycomb shaped hexagonal module assemblies 51 capable of storing larger volumes of water. External top 11 and bottom 31 modules are placed around the perimeter of the assembly 51 to define its outer extent. FIG. 10a represents an alternative embodiment with a honeycomb shaped square module assembly 153, with a combination of square shaped perimeter top modules 143 and perimeter bottom modules 149, a square perimeter corner top module 144, perimeter corner top module wall intersection 145 and internal top modules 132 and internal bottom modules 138.

Figure 12:
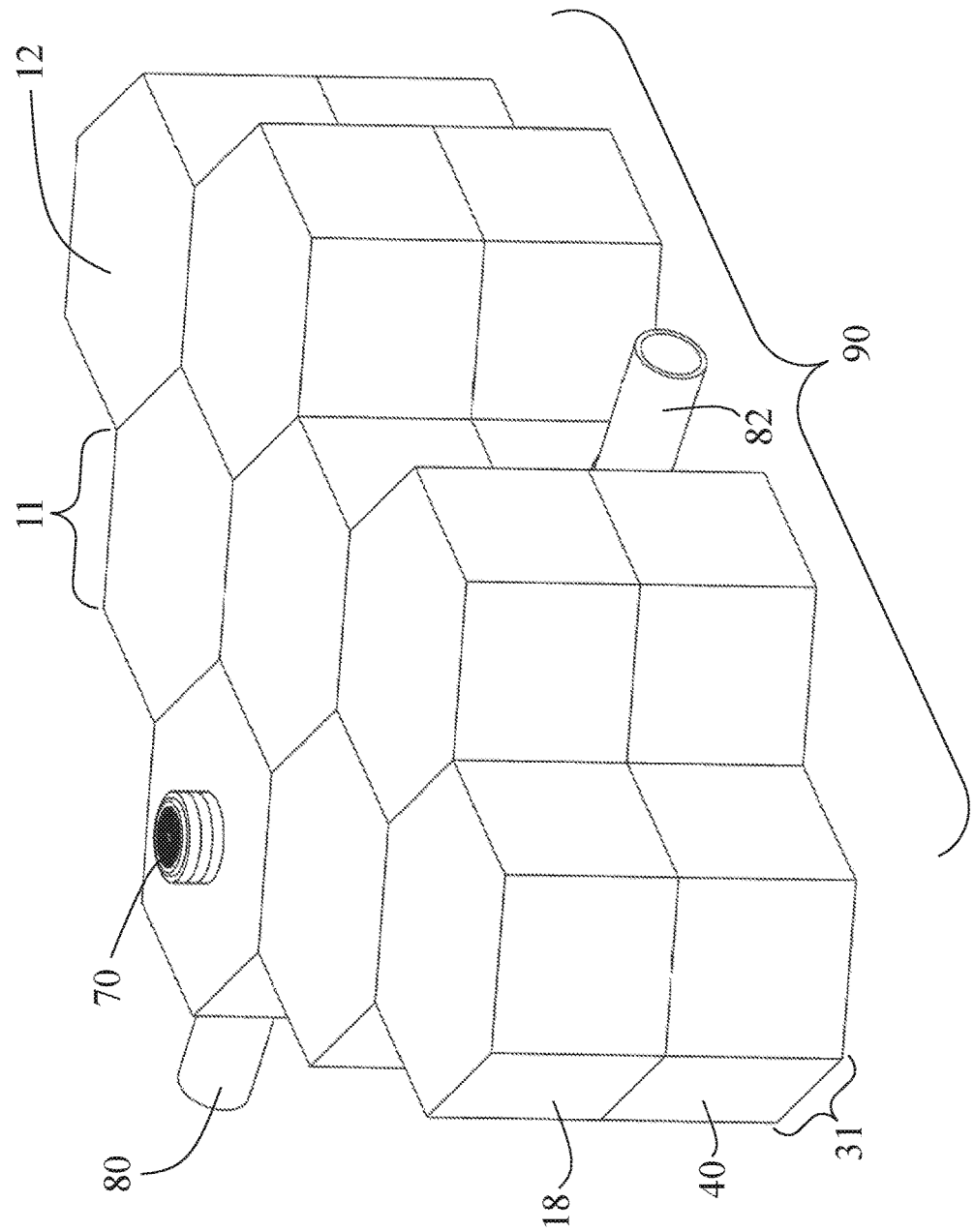
FIG. 12 illustrates a three-dimensional exterior view of FIG. 11 of a full hexagonal assembly storage system, in accordance with one embodiment.

The hexagonal module assemblies 50 made of many hexagonal top modules 10 or stacked top 10 and bottom 30 assembled hexagonal modules 51 are placed side by side in rows to create various shapes that are all arranged in a honeycomb pattern as in FIG. 12. As the number of stacked top 10 and 11 and bottom 30 and 31 internal and external modules grow the more flexibility there is to vary the shape of the complete assembly 90 into squares, circles, rectangles, L shapes, S shaped, U shaped and other shapes required to fit within the construction site constraints.

Figure 11:
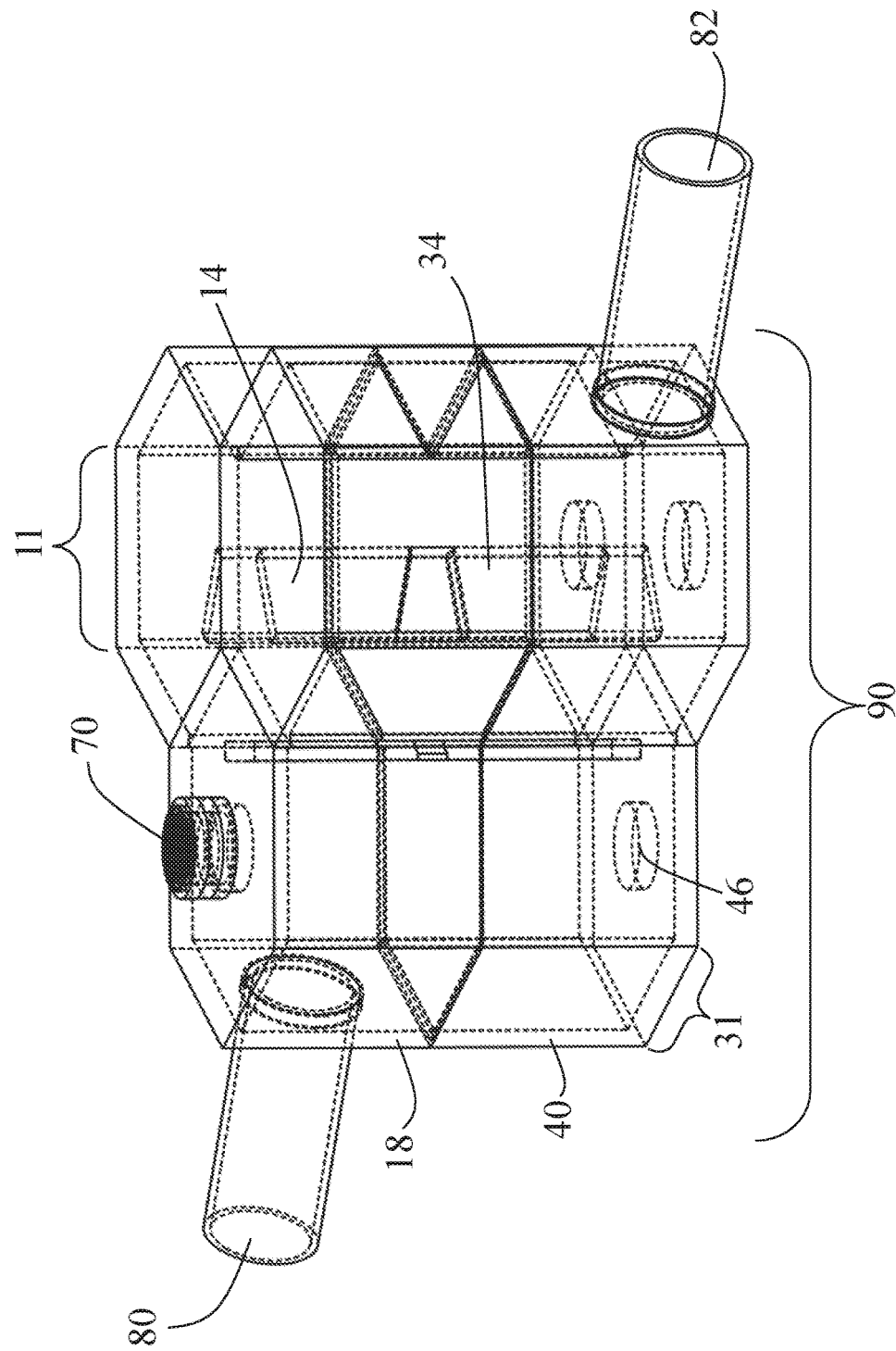
FIG. 11 illustrates a three-dimensional interior view of the full hexagonal module assembly storage system including perimeter hexagonal top modules 11 and perimeter hexagonal bottom modules 31 and an inflow pipe 80 and an outflow pipe 82, in accordance with one embodiment.
Figure 17:
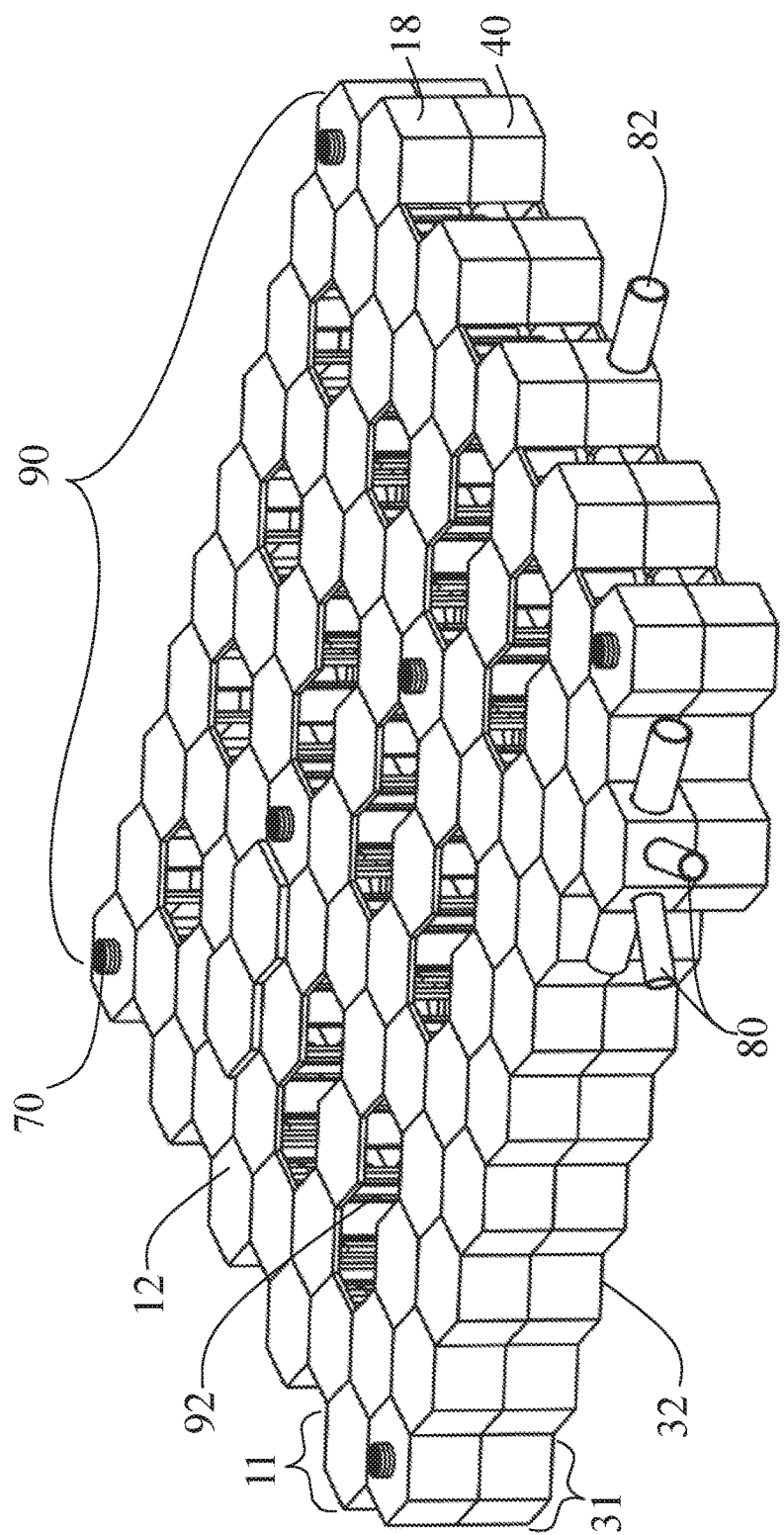
FIG. 17 illustrates a three-dimensional internal and external view of a full hexagonal module assembly storage system with a hexagonal module assembly internal void area 92, in accordance with one embodiment.
Figure 18:
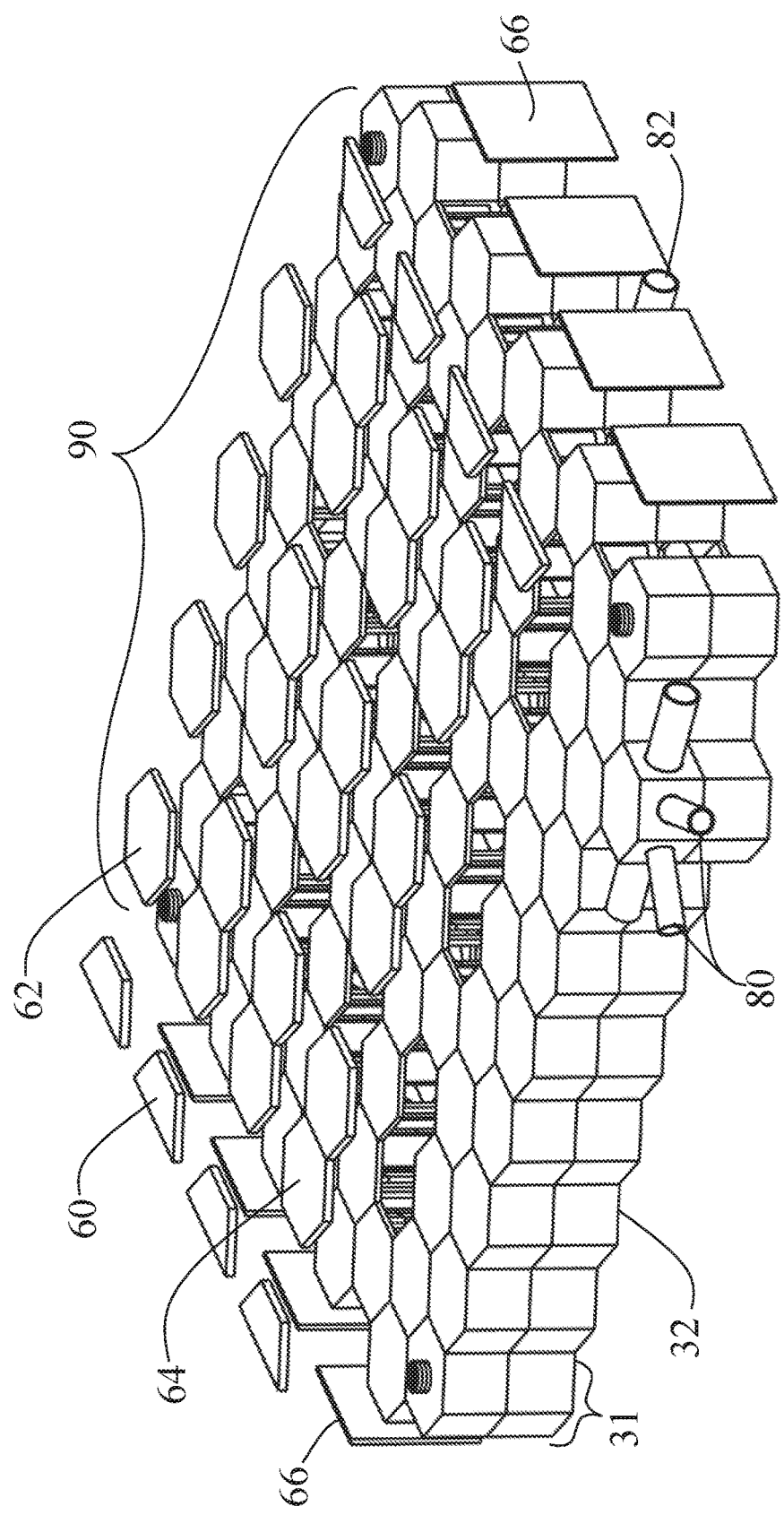
FIG. 18 illustrates an expanded view of FIG. 17 with side wall panels 66 and hexagonal top slabs (half, single, double), in accordance with one embodiment.

Referring to FIG. 11, FIG. 12, and FIG. 17, in certain embodiments, the individual modules have to be configured so that each module is in fluid communication with one another to allow water to fill up all modules evenly. This is achieved through minimization of top module side walls 18 and bottom module side walls 40 by only placing them along the perimeter of the complete assembly 90. Modules 11, 31, located on the perimeter of the hexagonal module assembly 90, will have solid side walls 18, 40 as the assembly 90 will be buried underground and be surrounded in soil.

Notably, others have used assemblies defining lateral and longitudinal channels to distribute water through underground assembly. In contrast, the present technology's enhanced function of the hexagonal module assembly has improved performance, functionality and accessibility of the assembly 90 by allowing water to freely flow and fill the assembly in all directions unimpeded by channels.

Figure 19:
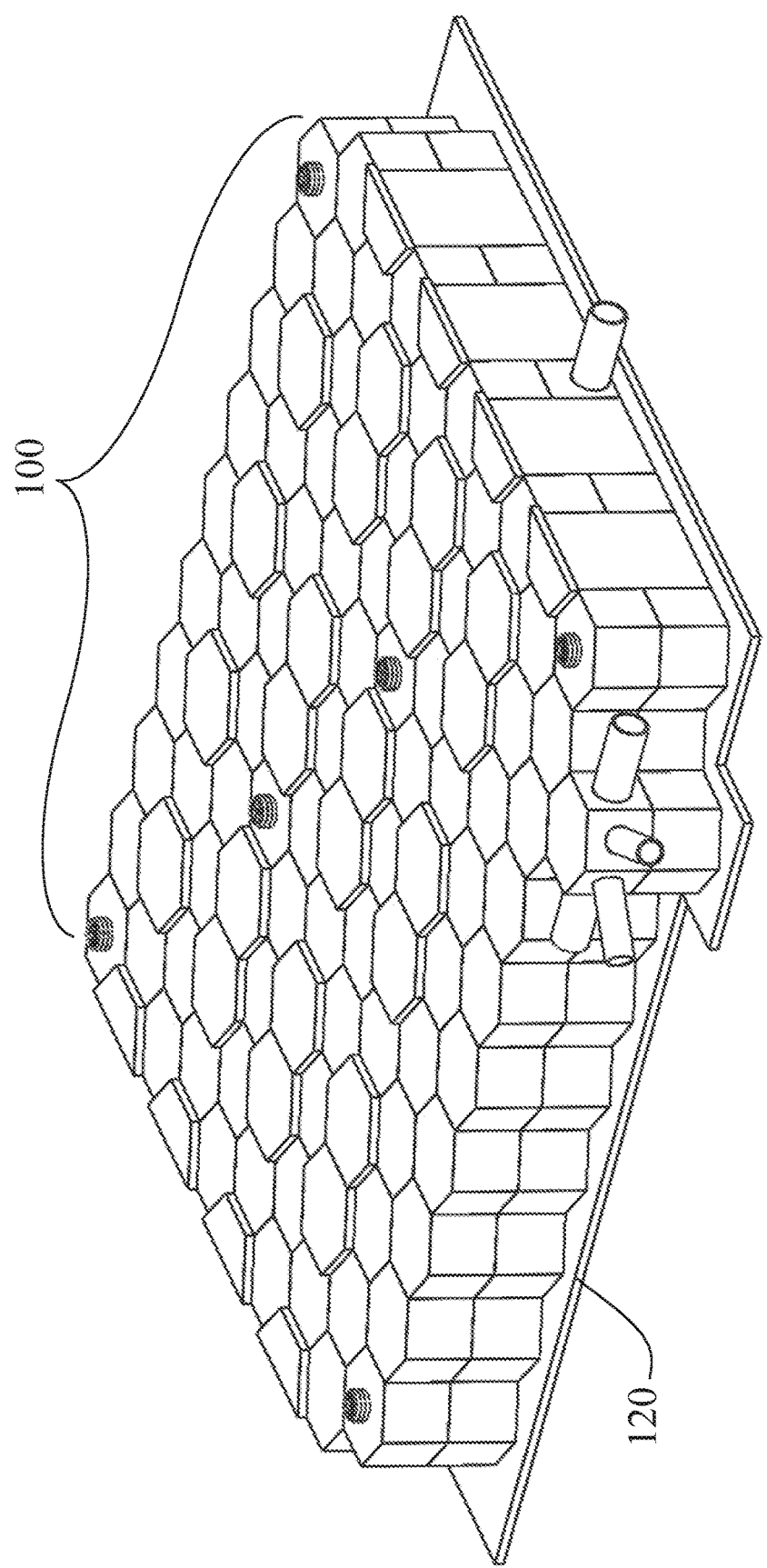
FIG. 19 illustrates a three-dimensional view of the complete hexagonal storage system assembly with top slabs and side panels on a gravel base 120, in accordance with one embodiment.

Additionally, as in FIG. 11 and FIG. 19, access riser and hatch assemblies 70, which are composed of a manhole cover 72, manhole cover frame 74, and one or more manhole access risers 76 to bring the assembly 70 up to ground level. Access into the module assembly 90 is provided via this access riser and hatch assembly 70 via a hole 6 in the top 12 of the top module 10 as shown in FIG. 1 and FIG. 2.

Because of the assembly 90 is honeycombed shaped each individual module 10, 30, 11, and 31 along the perimeter is supported and connected by at least two or more adjacent modules 10, 30, 11, and 31, two to three modules 10, 30, 11, and 31 in the corners and four modules 10, 30, 11, and 31 along the sides. The load distribution of this configuration is optimized due the to the honeycomb configuration of the assembly 90. Outer perimeter modules 11 and 31 make contact with other modules 10, 30, 11, and 31 on the two sides and make contact with two additional modules 10, 30, 11, and 31 along the next inner row or column of modules 10, 30, 11, and 31 and the contact is made at sixty degree angles so the load on the perimeter modules 10, 30, 11, and 31 is dispersed evenly to other modules 10, 30, 11, and 31. This even load disbursement provides the overall assembly 90 with maximum compression strength and thus able to handle soil pressures associated with deep installations.

Furthermore, referring to FIG. 11. and FIG. 12 and FIGS. 17 to 19, because of the load distribution among modules 10, 30, 11, and 31, some of the inner modules 10, 30, 11, and 31 can be removed, usually in a checkerboard pattern for adjacent rows and columns in an assembly 90. The honeycomb shaped pattern of the assembly 90 allows for the removal of the inner modules 10, 30, 11, and 31 without loss of strength. The internal void area 92 reduces the number of modules needed 10, 30, 11, and 31, and reduces the overall cost of the assembly 90. In some cases, two adjacent modules 10, 30, 11, and 31 in the same row or same column can be removed without sacrificing strength of the overall assembly 90. Overall the system is more efficient and more economically feasible due to less material being used to store the same amount of water along with decreasing the overall shipping costs that would be associated with additional modules 10, 30, 11, and 31.

Figure 14:
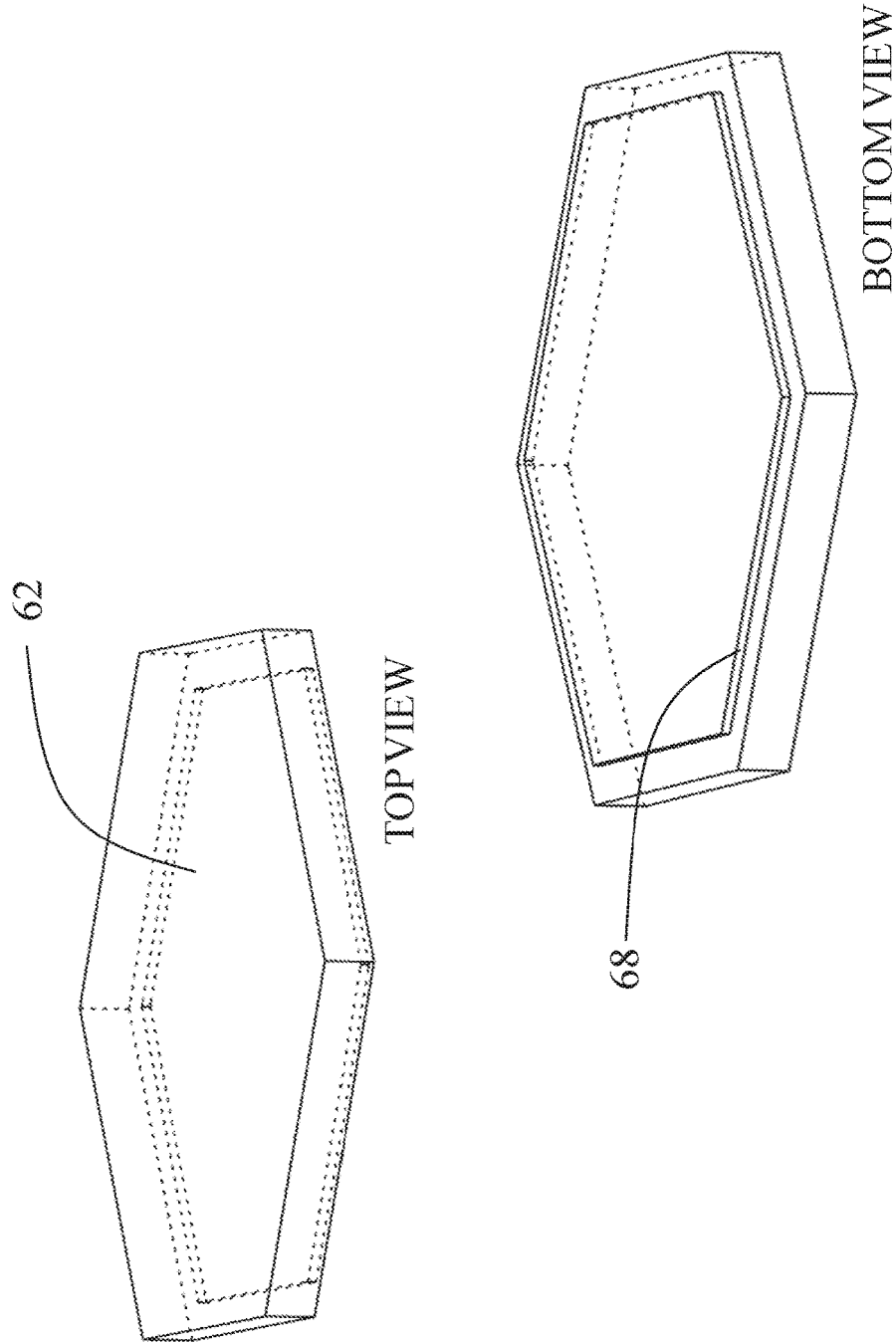
FIG. 14 illustrates three-dimensional top and bottom view of a hexagonal top slab 62 and a top slab notch down 68, used in a completed hexagonal storage system assembly and placed over a hexagonal module assembly internal void area, in accordance with one embodiment.

Referring again to FIG. 18, it is shown that additional top slabs are used to cover the module assembly internal void areas 92 to create an enclosed chamber. For locations where a single module 10 and 30 is removed, FIG. 14, as an example, depicts a hexagonal top slab 62 can be placed over the void 92. For locations where two adjacent modules 10 and 30 are removed FIG. 15 a double hexagonal top slab assembly 64 can be placed to cover the void 92.

Figure 13:
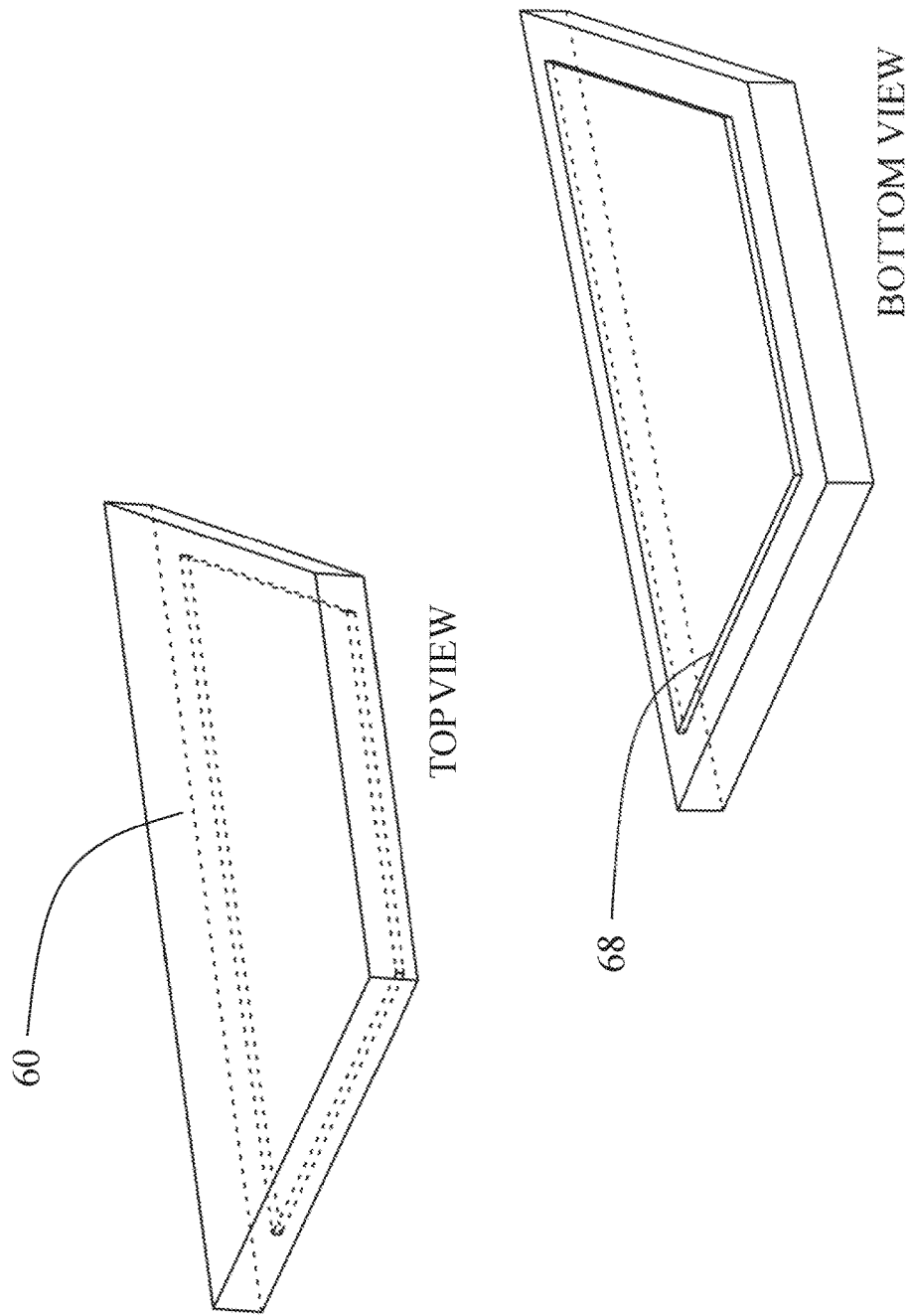
FIG. 13 illustrates a three-dimensional top and bottom view of a half-hexagonal top slab 60 and a top slab notch down 68, used in a completed hexagonal storage system assembly and placed over a hexagonal module assembly internal void area, in accordance with one embodiment.

In one embodiment, around the perimeter of the assembly 90 where the individual modules 11 and 31 are arranged in a honeycomb pattern, they stick out to create an indented perimeter, as depicted in FIG. 17. Side panels 66 can be placed over these indented areas for additional storage and create a more linear perimeter surface wall. Once these side panels 66 are placed, the resulting top of these additional void areas 92 can be covered with a half-hexagonal top slab 60 as presented in FIG. 13. The resulting is FIG. 19, is a complete hexagonal storage system assembly with top slabs and side panels 100.

Figure 20:
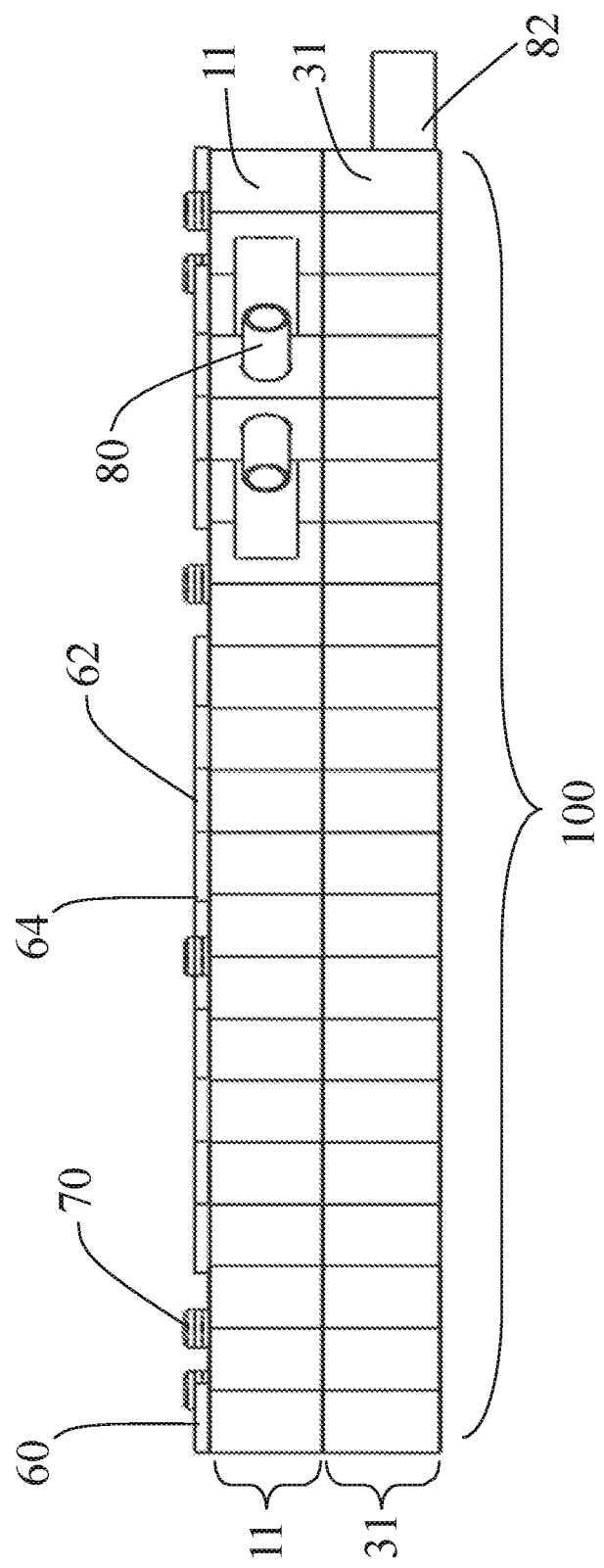
FIG. 20 illustrates a perspective side view of the completed, exterior module assembly of FIG. 19, in accordance with one embodiment.

FIG. 20 is a side-view of the completed hexagonal storage system assembly 100, and shows that multiple inflow pipes 80 and outflow pipes 82 can enter the assembly 100 at various positions on the side walls 18, 40 or 66 of the modules 11 and 31. The position of the various top slabs 60, 62, and 64 are also shown sitting above the module top 12 and forming a roof over the completed assembly 100 as depicted in one embodiment.

Figure 15:
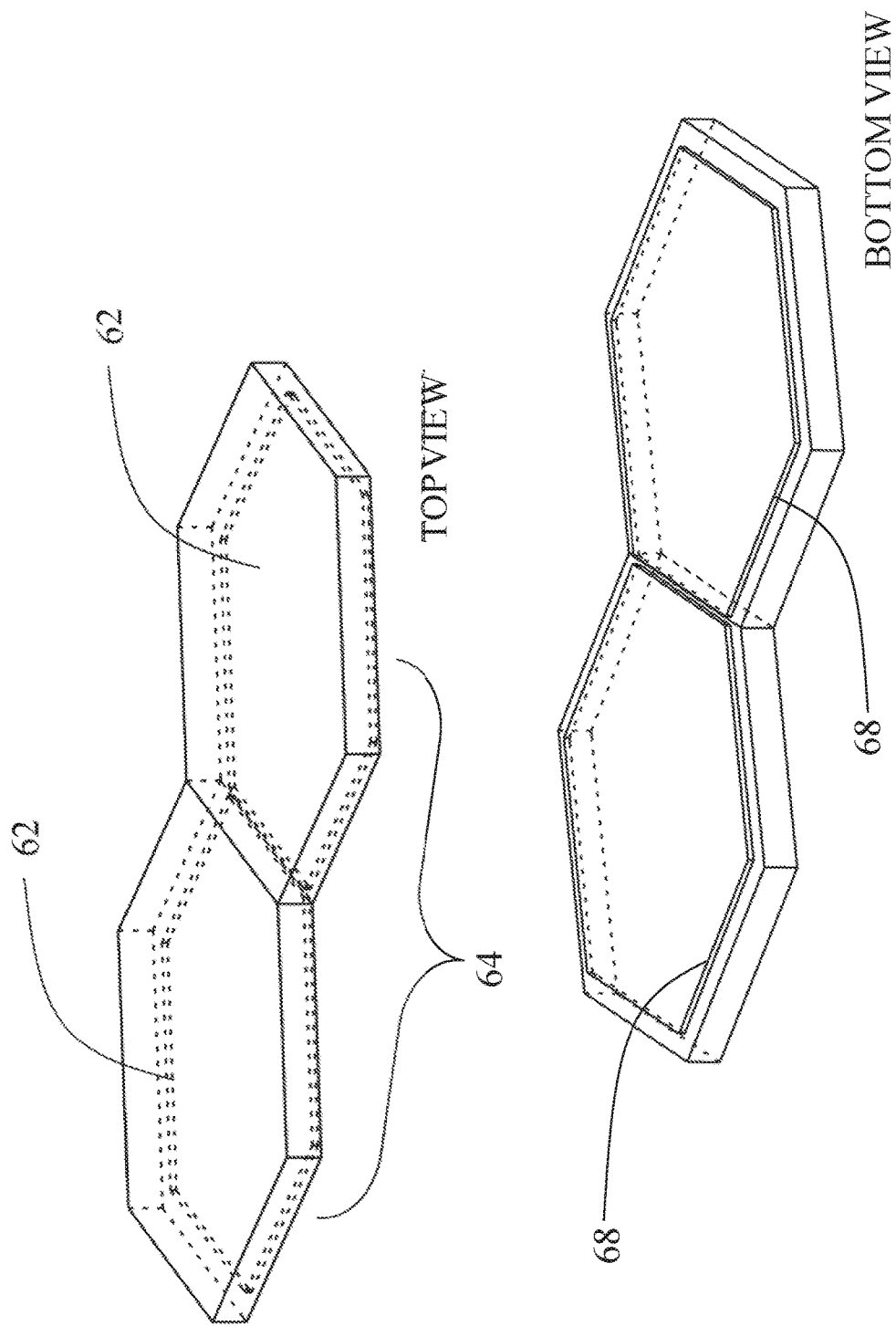
FIG. 15 illustrates a three-dimensional top and bottom view of double hexagonal top slab assembly, in accordance with one embodiment.
Figure 21:
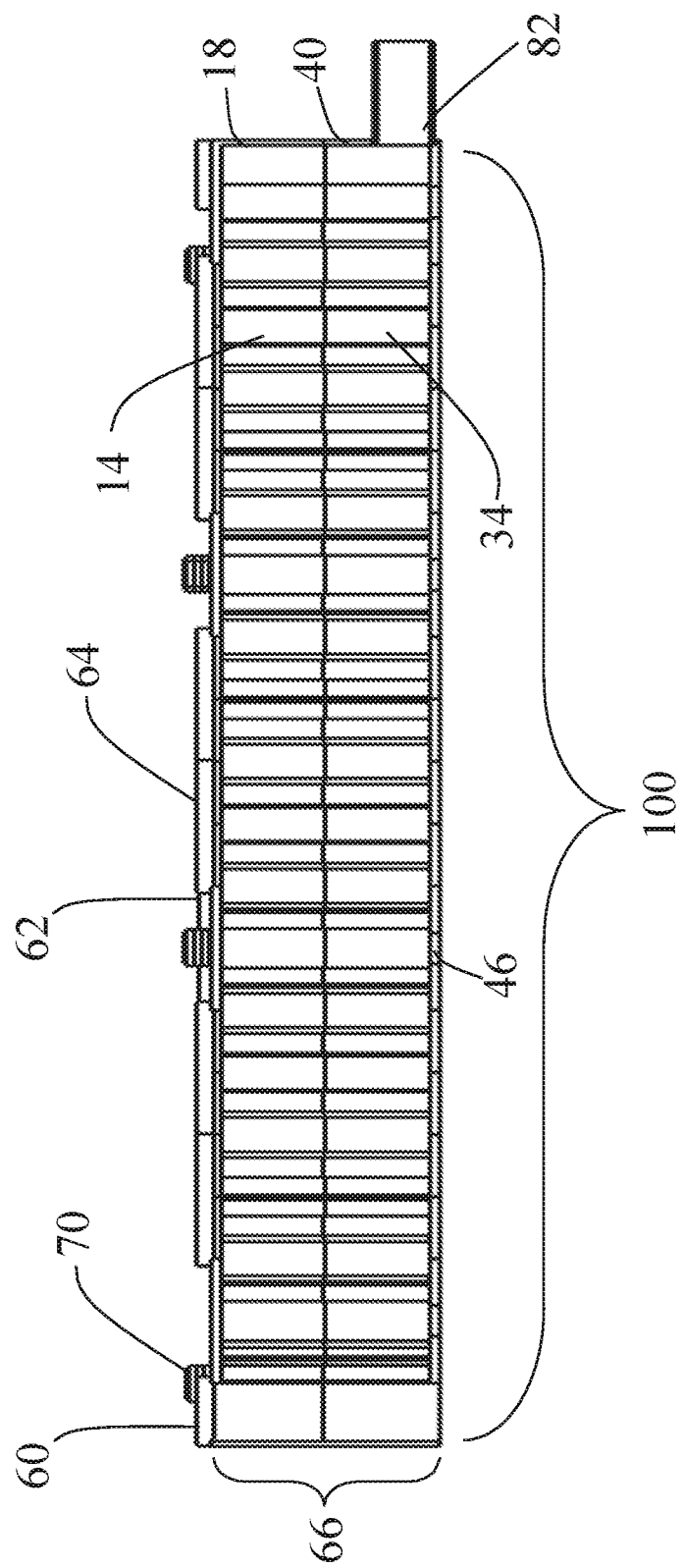
FIG. 21 illustrates a cut-away side view of the completed module assembly of FIG. 20, in accordance with one embodiment.

In accordance with one embodiment as presented in FIG. 21, is a side-cut-away view of the completed hexagonal storage system assembly 100 showing the internal components of the system including drainage holes 46, access riser and access hatch assembly 70 and the top slabs 60, 62, and 64. These top slabs are designed with flat top, of various thicknesses to handled surface loading conditions, and further have a notch down 68 on their bottom sides, as depicted in FIG. 15, in accordance with one embodiment. Further, FIG. 14, FIGS. 15 and FIG. 21 lock the top slabs 60, 62, and 64 in place when placed over the internal void areas 92. The notch down 68 is slightly narrower than the internal void area 92 on all sides and the top slabs 60, 62, and 64 larger than the void areas 92, in accordance with a further embodiment.

Figure 22:
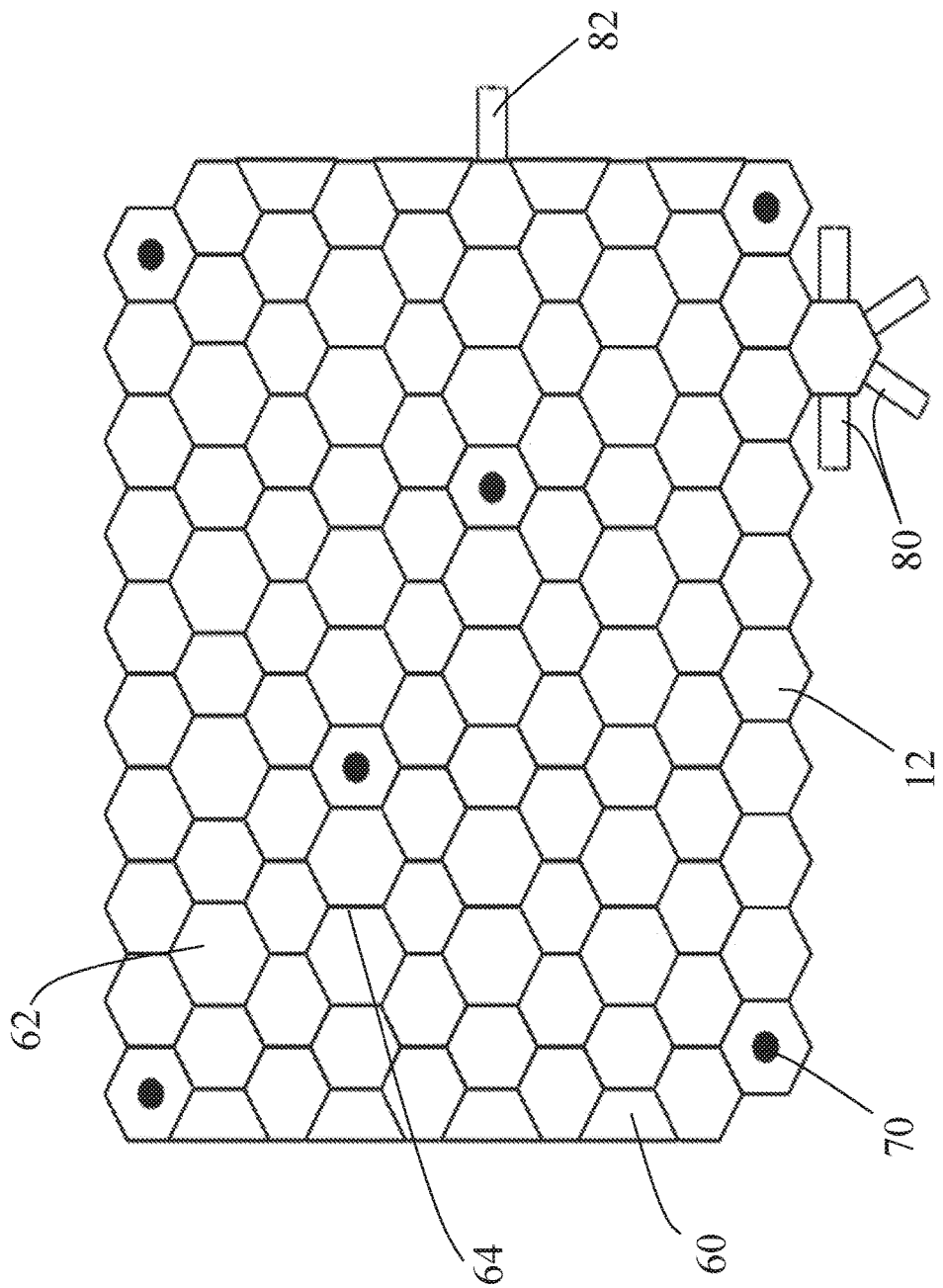
FIG. 22 illustrates a perspective top view of the exterior of the completed module assembly of FIG. 19, in accordance with one embodiment.

FIG. 22 is an illustrated embodiment of a top-view looking down on the complete hexagonal storage system assembly 100 and the resulting honeycomb pattern is formed.

Access riser and access hatch assemblies 70 are positioned throughout key points in individual module tops 12 and allows access into the system 100 through access holes 6 for maintenance and cleaning of the system 100.

Figure 23:
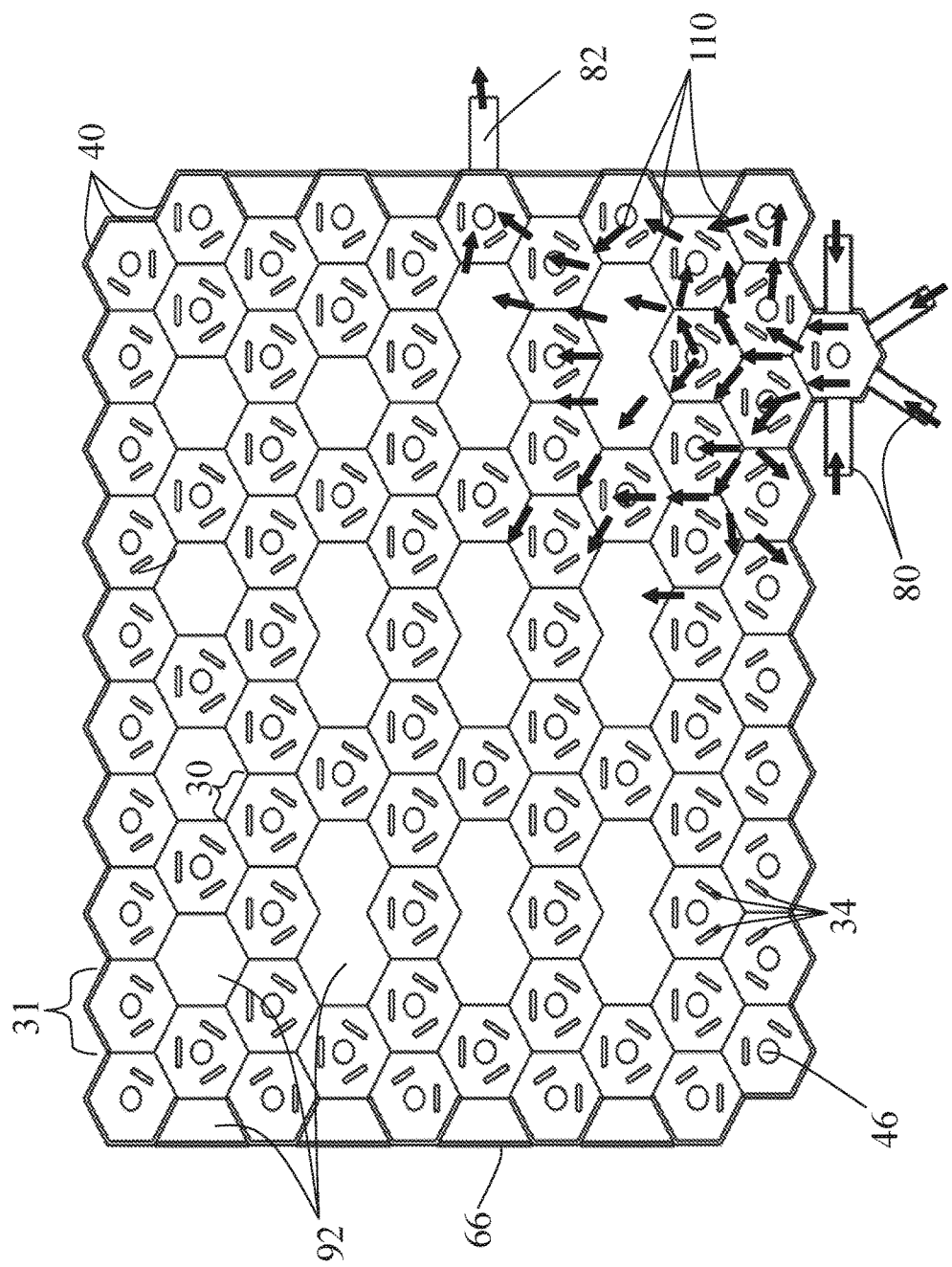
FIG. 23 illustrates a cut-away top view of the interior of FIG. 19, with multi-directional flow path of water 110 from an inflow pipe 80 and to an outflow pipe 82, in accordance with one embodiment. This figure illustrates how water can flow, resulting in ubiquitous flow for optimal water transfer and disbursement.

FIG. 23 presents a top-cut-away-view showing the internal space of the system 100, including various combinations of individual module walls 40, the internal void areas 92, side wall panels 66 along the two perimeter sides, and optional drainage holes 46, in accordance with one embodiment. Furthermore, FIG. 23 demonstrates, through use of arrows 110, how water flows from inflow pipes 80 to a first module and flows to other modules and internal void areas 92 unimpeded. Internal modules 10 and 30 allow water to flow freely in all directions for more efficient distribution of fluid within the completed assembly 100 and eventually exit via the outflow pipe 82 and/or infiltrate back into the soil below via drainage holes 46.

Figure 24:
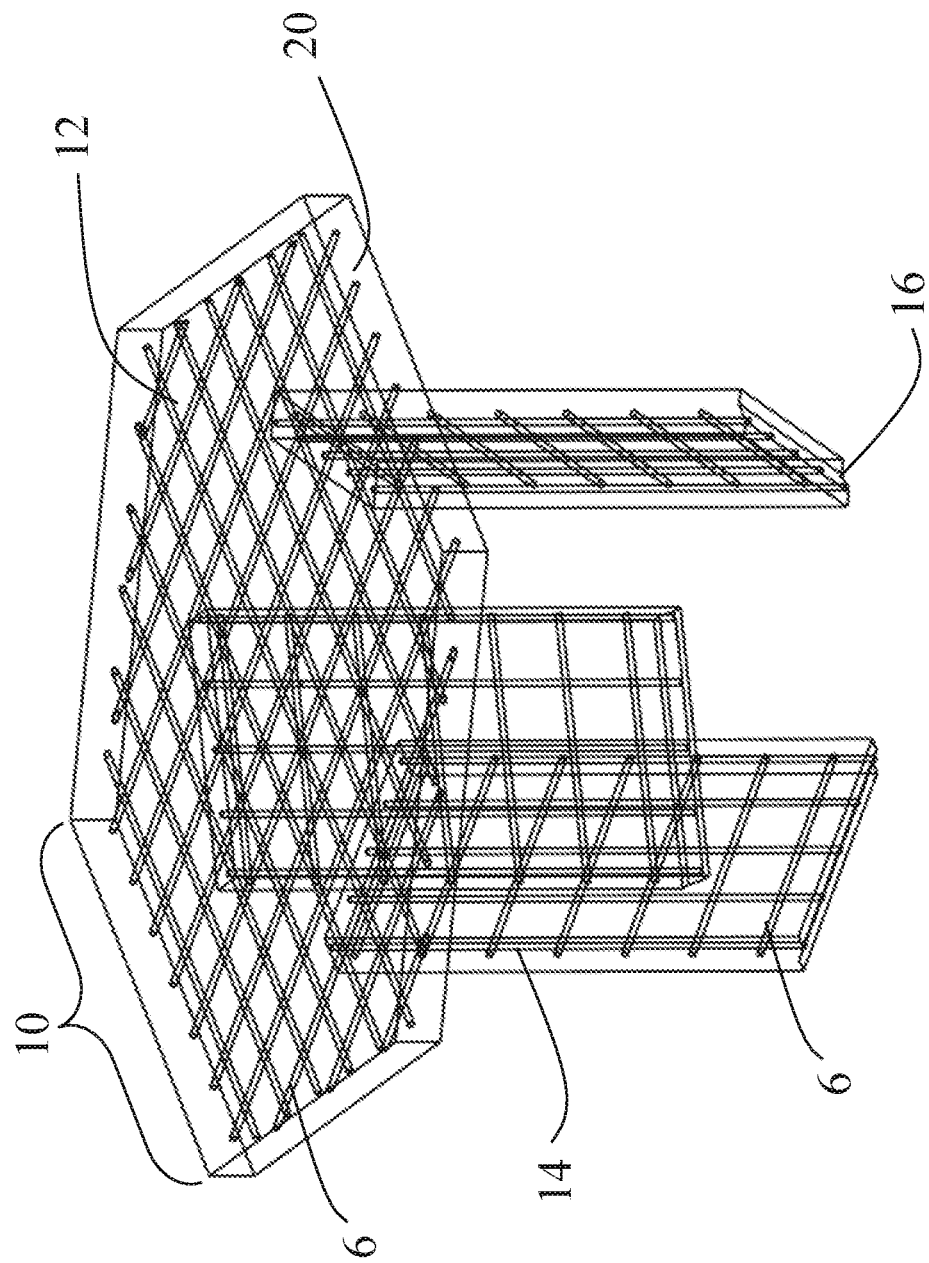
FIG. 24 illustrates a perspective view of FIG. 1 with internal rebar reinforcement 8 within a concrete module, in accordance with one embodiment.
Figure 25:
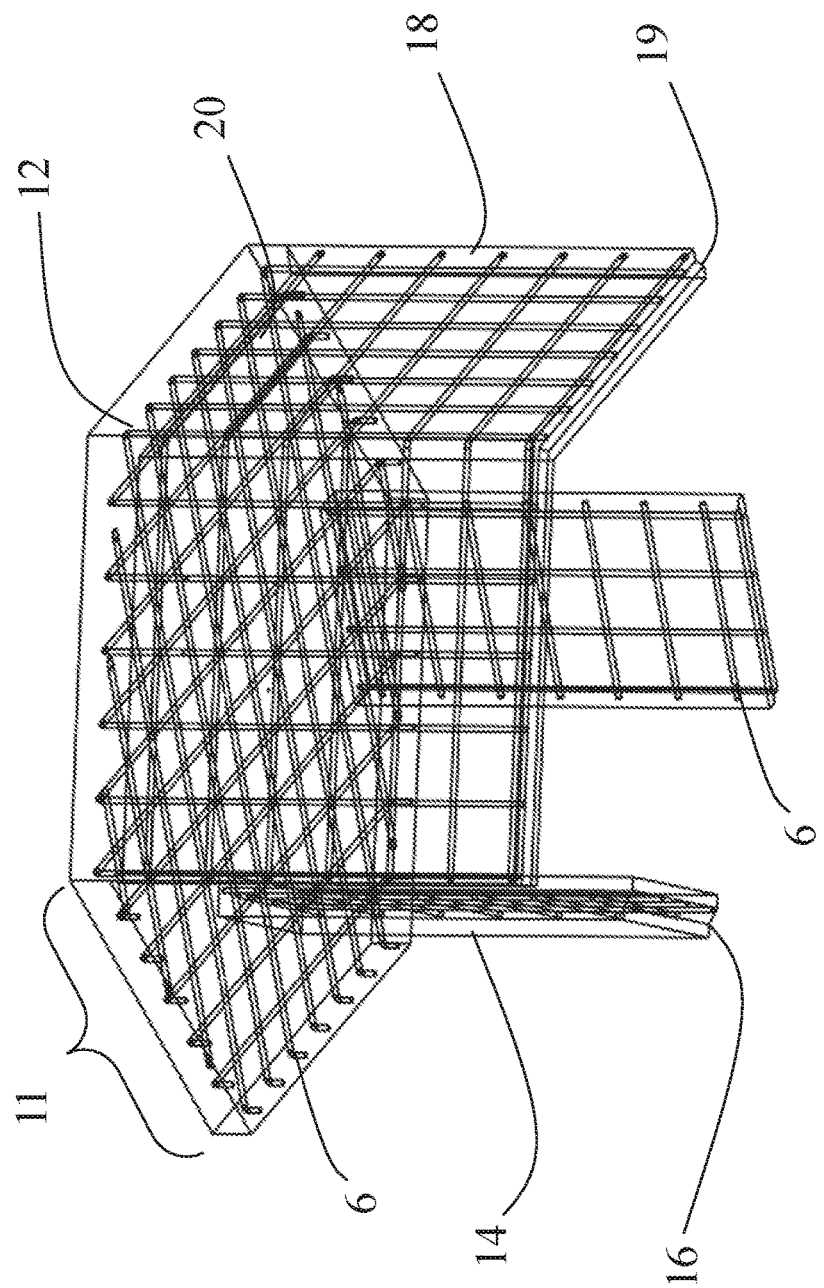
FIG. 25 illustrates a perspective view of FIG. 7 with the addition of a top module side wall 18 and a top module bottom of wall 19, in accordance with one embodiment.

FIG. 24 is an illustrated embodiment of a hexagonal top module and the associated internal metal rebar 8 configuration. For example, in one embodiment of modules 10 made of concrete, the structure has to be reinforced with rebar and/or rebar mesh 8, oriented in a criss-cross pattern. The rebar 8 should be used in the internal hexagonal top module 10 and the top module top 12, sides 20 and legs 14. See FIG. 25 as an example. Also, the rebar 8 should be used in the internal hexagonal bottom module's 30 floor 32, sides 40 and legs 34. The size and amount of rebar 8 is a function of the structure load requirements and soil conditions. This same rebar reinforcement would also be used in top slabs 60, 62, and 64 and side wall panel 66 and also including the manhole access risers 76.

In other embodiments composite or metal strands or other suitable construction materials in addition to rebar 8 or in place of rebar to reinforce the concrete or replace the need for rebar, may be employed and are possible and contemplated without departing from the scope of the present disclosure.

In an additional embodiment, the modules can be set up with the exterior bottom module having a solid floor section to detain or retain water. If infiltration of storm water into native soil is allowable or desired, the floor of each bottom module can include a drainage hole to allow captured storm water to exit the bottom of each module into the underlying rock base layer and or native soil for ground water recharge. FIG. 19, employs a gravel base floor 120;

however, it is understood that this representation is an example and that other representations, for example, a concrete slab, are possible and contemplated without departing from the scope of the present disclosure.

Figure 26:
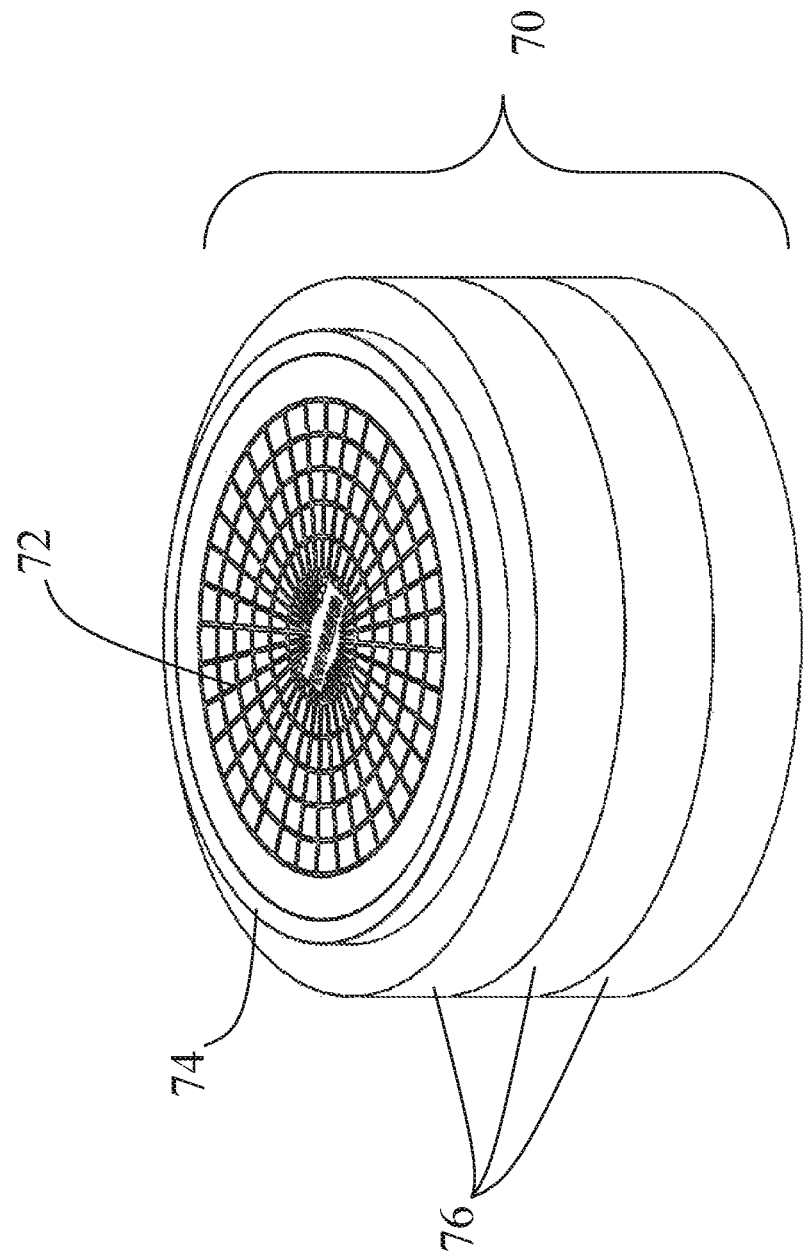
FIG. 26 illustrates an external perspective view of an access riser and access hatch assembly 70 with a manhole access cover 72, a manhole access cover frame 74, and manhole access risers 76, in accordance with one embodiment.

In yet another embodiment, FIG. 26 shows three components of the access riser and access hatch assembly 70 which consists of one or more manhole access risers 76 to bring the manhole access cover 72 and frame 74 up to ground level.

Figure 27:
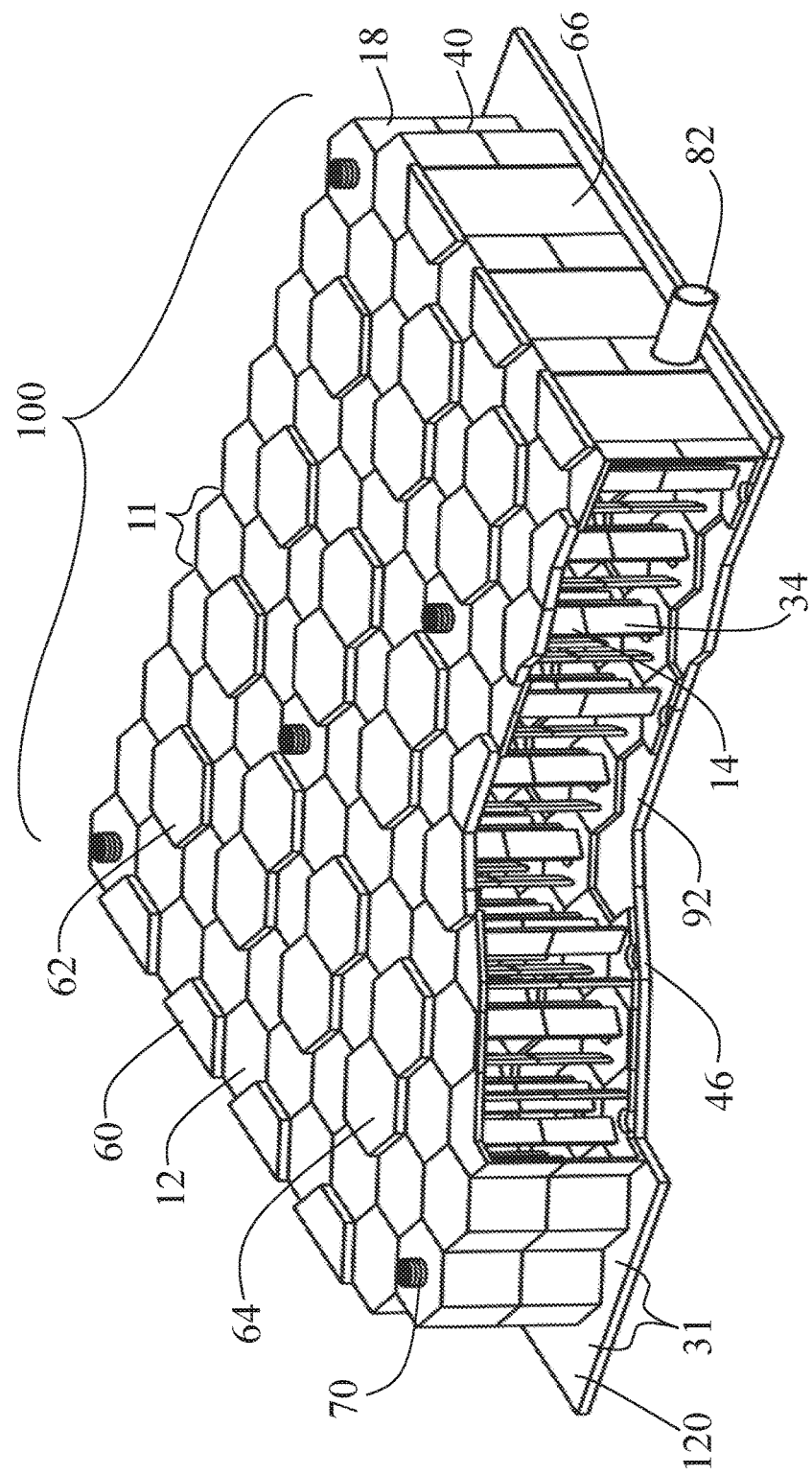
FIG. 27 illustrates a three-dimensional internal, cut-away and external view of a complete hexagonal storage system assembly with top slabs and side panels, in accordance with one embodiment.

In some embodiments, a hexagonal module and assembly of modules FIG. 27 for the underground collection and storage of water are built to handle site specific loading conditions. Surface loads applied to underground storage systems vary based upon pedestrian and vehicular traffic, and can be broken down into the following categories may be employed and are possible and contemplated without departing from the scope of the present disclosure.

Parkway loading includes sidewalks and similar areas that are adjacent to streets and other areas with vehicular traffic. Indirect traffic loading includes areas that encounter daily low speed traffic from vehicles ranging from small cars up to semi-trucks. Direct traffic loading includes areas, such as streets and interstates that encounter a high volume of high speed traffic from vehicles ranging from small cars to large semi-trucks. There is also heavy duty equipment loading that includes traffic from, for example, airplanes and heavy port equipment.

Accordingly, underground storage systems of the present invention may be constructed having walls, floors, and/or ceilings of various thicknesses, shapes and strengths (e.g., differing thicknesses of concrete or steel or differing amounts of rebar) such that they achieve a parkway load rating (e.g., a H10 load rating), an indirect traffic load rating (e.g., a H20 load rating), a direct traffic load rating (e.g., a H20 load rating), or a heavy duty equipment load rating (e.g., a H25 load rating), as required for a given installation site. Such embodiments may be employed and are possible and contemplated without departing from the scope of the present disclosure.

The above specification, examples, and data provide a complete description of the structure and use of exemplary embodiments. Feature(s) of the different embodiment(s) may be combined in yet another embodiment without departing from the recited claims.

We claim:

1. A honeycomb shaped assembly system for storing water underground, wherein the honeycomb shaped assembly system is comprised of a plurality of individual adjoining hexagonal modules,
    wherein each hexagonal module is comprised of a hexagonally-shaped top, a combination of walls and/or legs extending downward from said hexagonally-shaped top depending on their position within the assembly,
    wherein modules along the perimeter of the assembly contain one or more walls to define the perimeter of the assembly to create an overall enclosed storage system,
    wherein, said walls are defined by extending vertically downward from said hexagonally-shaped top, along its edges so that said top and walls intercept one another at their ends,
    wherein said modules along the perimeter have one or more legs extending vertically from the hexagonally-shaped top, and positioned inward from the edges of the hexagonally-shaped top, and generally positioned on sides of the hexagonally-shaped top not having walls,
    wherein modules not along the perimeter of the assembly only having two or more legs extending vertically from the hexagonally-shaped top, and positioned inward from the edges of the hexagonally-shaped top, wherein the resulting assembly of internal and perimeter modules is defined by only having perimeter walls, and multiple internal legs, said legs not in contact with one another within modules or between adjacent modules, and resulting in a system with no defined channels, wherein said modules of honeycomb shaped assembly are arranged as a regular hexagonal tiling in which three hexagons meet at each vertex such that all walls of all modules are of the same width and are assembled such that walls of adjacent modules are lined up symmetrically with walls of all other modules, resulting in only 120 degree angles at each vertex of all adjoined hexagonal modules so three hexagonal modules at a point make a full 360 degrees, wherein at least one said module has an access hole in its top for access into said honeycomb shaped assembly system after installation underground.

2. A honeycomb shaped assembly system of claim 1, wherein the modules are stacked together to create a taller overall module, wherein one module, known as the top module, has a hexagonally-shaped top with downward extending legs and/or walls, and second module, known as the bottom module having a hexagonally-shaped bottom with upward extending legs and/or walls, wherein modules being stacked have identical combinations of legs and/or walls, and the top module is stacked directly over the bottom module and secured in place utilizing joints placed at the bottom edge of the side legs and/or walls of the hexagonal top module and the top edge of the side walls of the hexagonal bottom module, respectively.

3. A honeycomb shaped assembly system of claim 2, wherein the joint is a shiplap joint, with one module having a female joint and the other module having a male joint.

4. A honeycomb shaped assembly system of claim 1, containing one or more inflow and/or outflow pipes in module top or wall.

5. A honeycomb shaped assembly system of claim 1, containing drainage holes in the bottom of said module to allow water to exit the system and percolate into underlying gravel layer or soils.

6. A honeycomb shaped assembly system of claim 1, in which up to 35% of internal hexagonal shaped modules with legs are removed without reducing the overall assembly strength and resultant internal void areas are covered by a hexagonal shaped top slab larger than the resultant void area of the removed module(s), said hexagonal shaped top slab having a notch down on its bottom side that is smaller than the void area to lock it in place within the assembly.

7. A honeycomb shaped assembly system of claim 1, in which vertically extending side panels are added to the external perimeter of the assembly on sides of the assembly in which every other hexagonal module extends out 30% or more further than adjacent modules, said side panel extending between said modules to create additional void space and water storage, said void areas covered with a top slab shaped as a half-hexagon, said top slab having a notch down on its bottom side that is smaller than the void area to lock it in place within the assembly.

8. A honeycomb shaped assembly system of claim 1, where the hexagonal top module, hexagonal bottom module, hexagonal top slab, and side panel are all comprised of concrete reinforced with rebar.

9. A honeycomb shaped assembly system of claim 1, where the top access hole is covered with an access frame and cover and includes access risers to extend the access frame and cover to finish surface from the top access hole located underground.

10. A honeycomb shaped assembly system of claim 1, made water tight using an impervious liner, sealant or other means to prevent leakage.

11. A honeycomb shaped assembly system of claim 1, wherein only bottom modules along with top slabs are stacked and assembled to form a storage system.

12. A honeycomb shaped assembly system of claim 1, where the top access hole is covered with an access frame and cover.

13. A honeycomb shaped assembly system for storing water underground, wherein the honeycomb shaped assembly system is comprised of a plurality of individual adjoining hexagonal modules, wherein each hexagonal module is comprised of a hexagonally-shaped top, legs extending downward, from said hexagonally-shaped top depending on their position within the assembly, wherein each hexagonal module having two or more legs extending vertically from the hexagonally-shaped top, and positioned inward from the edges of the hexagonally-shaped top, wherein said modules of honeycomb shaped assembly are arranged as a regular hexagonal tiling in which three hexagons meet at each vertex such that all walls of all modules are of the same width and are assembled such that walls of adjacent modules are lined up symmetrically with walls of all other modules, resulting in only 120 degree angles at each vertex of all adjoined hexagonal modules so three hexagonal modules at a point make a full 360 degrees, wherein at least one said module has an access hole in its top for access into said honeycomb shaped assembly system after installation underground, and wherein said honeycomb shaped assembly includes one or more inflow and/or outflow pipes in module top or wall.

14. A honeycomb shaped assembly system of claim 13, in which vertically extending side panels are added to the external perimeter of the assembly on sides of the assembly, wherein at least one said module has an access hole in its top for access into said honeycomb shaped assembly system after installation underground.

15. A honeycomb shaped assembly system of claim 13, wherein the modules are stacked together to create a taller overall module, wherein one module, known as the top module, has a hexagonally-shaped top with downward extending legs, and second module, known as the bottom module, having a hexagonally-shaped bottom with upward extending legs, wherein modules being stacked have identical combinations of legs, and the top module is stacked directly over the bottom module and secured in place utilizing joints placed at the bottom edge of the side legs of the hexagonal top module, respectively.

16. A honeycomb shaped assembly system of claim 15, containing drainage holes in the bottom of said module to allow water to exit the system and percolate into underlying gravel layer or soils.

17. A honeycomb shaped assembly system of claim 15, wherein the joint is a shiplap joint, with one module having a female joint and the other module having a male joint.

18. A honeycomb shaped assembly system of claim 13, in which up to 35% of internal hexagonal shaped modules with legs are removed without reducing the overall assembly strength and resultant internal void areas are covered by a hexagonal shaped top slab larger than the resultant void area of the removed module(s), said hexagonal shaped top slab having a notch down on its bottom side that is smaller than the void area to lock it in place within the assembly.

19. A honeycomb shaped assembly system of claim 13, where the hexagonal top module, hexagonal bottom module, hexagonal top slab, and side panel are all comprised of concrete reinforced with rebar.

20. A honeycomb shaped assembly system of claim 13, where the top access hole is covered with an access frame and cover and includes access risers to extend the access frame and cover to finish surface from the top access hole located underground.

21. A honeycomb shaped assembly system of claim 13, made water tight using an impervious liner, sealant or other means to prevent leakage.

22. A honeycomb shaped assembly system of claim 13, wherein only bottom modules along with top slabs are stacked and assembled to form a storage system.

23. A honeycomb shaped assembly system of claim 13, where the top access hole is covered with an access frame and cover.

24. A method of assembling a hexagonal top module assembly system using only hexagonal top modules comprised of the steps of
   identifying the shape of the hexagonal module assembly desired,
   selecting and assembling the needed number of hexagonal top modules walls and/or legs, hexagonal top modules with top access holes, and hexagonal top modules with inflow pipes,
   excavating the site for assembly of the hexagonal top module assembly,
   placing dirt, concrete or rock on the floor of said excavated site,
   placing one or more of the hexagonal top modules together, open end down such that their side walls press directly against each other,
   arranging said hexagonal top modules such that the exterior modules defining the perimeter of the overall assembly have walls, that the internal hexagonal top modules, each have two or more legs,
   arranging that at least one hexagonal top module possesses a top access hole and that at least one exterior hexagonal top module possesses an inflow pipe,
   adding side panels and cover panels to the hexagonal module assembly system,
   filling in the surrounding area of said excavation with rock and gravel,
   covering over the hexagonal module assembly system with dirt or other coverings.

25. A method of assembling a hexagonal top and bottom module assembly system using both hexagonal top and bottom modules comprised of the steps of
   identifying the shape of the hexagonal module assembly desired,
   selecting and assembling the needed number of hexagonal top and bottom modules walls and/or legs, hexagonal top modules with top access holes, and hexagonal modules with inflow pipes,
   excavating the site for assembly of the hexagonal top module assembly,
   placing dirt, concrete or rock on the floor of said excavated site,
   placing one or more of the hexagonal bottom modules together, open end up,
   arranging said hexagonal bottom modules such that the exterior modules defining the perimeter of the overall assembly have walls, that the internal hexagonal bottom modules each have two or more legs,
   arranging said hexagonal top modules over identical bottom modules and stacking and securing utilizing a ship lap joint to join together,
   arranging that at least one hexagonal top module possesses a top access hole and that at least one exterior hexagonal top module possesses an inflow pipe,
   adding side panels and cover panels to the hexagonal module assembly system,
   filling in the surrounding area of said excavation with rock and gravel,
   covering over the hexagonal module assembly system with dirt or other coverings.

26. A square honeycomb shaped assembly system for storing water underground, wherein the honeycomb shaped assembly system is comprised of a plurality of individual adjoining square modules,
   wherein each square module is comprised of a square-shaped top, a combination of walls and/or legs extending downward from said square-shaped top depending on their position within the assembly,
   wherein modules along the perimeter of the assembly contain one or more walls to define the perimeter of the assembly to create an overall enclosed storage system,
   wherein, said walls are defined by extending vertically downward from said square-shaped top, along its edges so that said top and walls intercept one another at their ends,
   wherein said modules along the perimeter have one or more legs extending vertically from the square-shaped top, and positioned inward from the edges of the square-shaped top, and generally positioned on sides of the square-shaped top not having walls,
   wherein modules not along the perimeter of the assembly only having three or more legs extending vertically from the square-shaped top, and positioned inward from the edges of the square-shaped top,
   wherein the resulting assembly of internal and perimeter modules is defined by only having perimeter walls, and multiple internal legs, said legs not in contact with one another within modules or between adjacent modules, and resulting in a system with no defined channels,
   wherein said modules of square honeycomb shaped assembly are arranged as a square tilling honeycomb in which four square meet at each vertex such that all walls of all modules are of the same width and are assembled such that walls of adjacent modules are lined up symmetrically with walls of all other modules, resulting in only 90 degree angles at each vertex of all adjoined square modules so four square modules at a point make a full 360 degrees,
   wherein at least one said module has an access hole in its top for access into said square honeycomb shaped assembly system after installation underground.

27. A square honeycomb shaped assembly system of claim 26, wherein the modules are stacked together to create a taller overall module,
   wherein one module, known as the top module, has a square-shaped top with downward extending legs and/or walls, and second module, known as the bottom module having a square-shaped bottom with upward extending legs and/or walls, wherein modules being stacked have identical combinations of legs and/or walls, and the top module is stacked directly over the bottom module and secured in place utilizing joints placed at the bottom edge of the side legs and/or walls of the square top module and the top edge of the side walls of the square bottom module, respectively.

28. A square honeycomb shaped assembly system of claim 27, containing drainage holes in the bottom of said module to allow water to exit the system and percolate into underlying gravel layer or soils.

29. A square honeycomb shaped assembly system of claim 26, in which vertically extending side panels are added to the external perimeter of the assembly.

30. A square honeycomb shaped assembly system of claim 26, where the top access hole is covered with an access frame and cover and includes access risers to extend the access frame and cover to finish surface from the top access hole located underground.

31. A square honeycomb shaped assembly system of claim 26, where the top access hole is covered with an access frame and cover.

* * * * *